United States Patent
Chen et al.

(10) Patent No.: US 9,055,576 B2
(45) Date of Patent: Jun. 9, 2015

(54) UPLINK RESOURCE ALLOCATION FOR LTE ADVANCED

(75) Inventors: Wanshi Chen, San Diego, CA (US);
Peter Gaal, San Diego, CA (US);
Aamod Dinkar Khandekar, San Diego, CA (US); Juan Montojo, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 474 days.

(21) Appl. No.: 12/900,194

(22) Filed: Oct. 7, 2010

(65) Prior Publication Data

US 2011/0085513 A1    Apr. 14, 2011

Related U.S. Application Data

(60) Provisional application No. 61/249,911, filed on Oct. 8, 2009, provisional application No. 61/255,440, filed on Oct. 27, 2009.

(51) Int. Cl.
*H04W 4/00* (2009.01)
*H04W 72/04* (2009.01)
*H04B 7/04* (2006.01)
(Continued)

(52) U.S. Cl.
CPC ........... *H04W 72/042* (2013.01); *H04B 7/0417* (2013.01); *H04B 7/063* (2013.01); *H04B 7/0639* (2013.01); *H04L 5/0023* (2013.01); *H04L 5/0048* (2013.01); *H04L 5/0053* (2013.01); *H04L 5/0094* (2013.01)

(58) Field of Classification Search
CPC . H04L 5/0007; H04L 5/0053; H04L 45/0023; H04W 72/042
USPC .......................................................... 370/330
See application file for complete search history.

(56) References Cited

U.S. PATENT DOCUMENTS

2010/0103901 A1* 4/2010 Miki et al. ..................... 370/330
2010/0124197 A1* 5/2010 Pi .................................. 370/329
(Continued)

FOREIGN PATENT DOCUMENTS

| CN | 1917706 A | 2/2007 |
|---|---|---|
| CN | 101394199 A | 3/2009 |
| CN | 101541063 A | 9/2009 |

OTHER PUBLICATIONS

3rd Generation Partnership Project; Technical Specification Group Radio Access Network; Evolved Universal Terrestrial Radio Access (E-UTRA); Physical layer procedures (Release 8) (May 2008).*
(Continued)

*Primary Examiner* — Hassan Kizou
*Assistant Examiner* — Deepa Belur
(74) *Attorney, Agent, or Firm* — Larry Moskowitz

(57) ABSTRACT

Methods, systems, apparatus and computer program products are provided to receive downlink control information (DCI) in a downlink control channel, where the downlink control information configured to indicate an allocation of uplink resources with a clustered uplink resource allocation protocol or a contiguous uplink resource allocation protocol, to detect which of the clustered uplink resource allocation protocol and the contiguous uplink resource allocation protocol is indicated and to allocate the uplink resources based on the indicated uplink resource allocation protocol.

39 Claims, 10 Drawing Sheets

(51) Int. Cl.
*H04B 7/06* (2006.01)
*H04L 5/00* (2006.01)

(56) References Cited

U.S. PATENT DOCUMENTS

| | | | |
|---|---|---|---|
| 2010/0131644 A1* | 5/2010 | Jeong et al. | 709/224 |
| 2010/0142455 A1* | 6/2010 | Imamura | 370/329 |
| 2010/0142467 A1* | 6/2010 | Tiirola et al. | 370/329 |
| 2010/0195604 A1* | 8/2010 | Papasakellariou et al. | 370/329 |
| 2010/0214997 A1* | 8/2010 | Tao et al. | 370/329 |
| 2010/0279628 A1* | 11/2010 | Love et al. | 455/70 |
| 2012/0033627 A1* | 2/2012 | Li et al. | 370/329 |
| 2012/0063469 A1* | 3/2012 | Iwai et al. | 370/463 |
| 2012/0127939 A1* | 5/2012 | Frederiksen et al. | 370/329 |
| 2012/0170541 A1* | 7/2012 | Love et al. | 370/329 |
| 2012/0213167 A1* | 8/2012 | Xu et al. | 370/329 |
| 2012/0314678 A1* | 12/2012 | Ko et al. | 370/329 |
| 2013/0021991 A1* | 1/2013 | Ko et al. | 370/329 |
| 2014/0064218 A1* | 3/2014 | Kim et al. | 370/329 |

OTHER PUBLICATIONS

Asustek: "Non-contiguous uplink resource allocation for LTE-A", 3GPP Draft; R1-092730 Non-Contiguous Uplink Resource Allocation for LTE-A, 3rd Generation Partnership Project (3GPP), Mobile Competence Centre; 650, Route des Lucioles; F-06921 Sophia-Antipolis Cedex; France, No. Los Angeles, USA; 20090623, Jun. 23, 2009, XP050351194, [retrieved on Jun. 23, 2009].

International Search Report and Written Opinion—PCT/US2010/052035, International Search Authority—European Patent Office—Aug. 2, 2011.

Motorola: "DCI for uplink non-contiguous RB allocations", 3GPP Draft; R1-091349—DCI for UL Non-Contig RA-, 3rd Generation Partnership Project (3GPP), Mobile Competence Centre; 650, Route des Lucioles; F-06921 Sophia-Antipolis Cedex; France, No. Seoul, Korea; 20090318, Mar. 18, 2009, XP050338943, [retrieved on Mar. 18, 2009].

Motorola: "PDCCH Design for Carrier Aggregation and Post Rel-8 features", 3GPP TSG-RAN WG1#58, 3GPP, R1-093417, Shenzhen, China, Aug. 24-28, 2009.

Panasonic: "DCI format and blind decoding for LTE-Advanced", 3GPP TSG-RAN WG1 Meeting #58bis, 3GPP, R1-093941, Miyazaki, Japan, Oct. 12-16, 2009.

Qualcomm Europe: "UL Resource Allocation for PUSCH", 3GPP TSG-RAN WG1 #58bis, 3GPP, R1-094210, Miyazaki, Japan, Oct. 12-16, 2009.

Panasonic, Remaining Issue on PDCCH for Common Control Channel,3GPP TSG-RAN WG1 Meeting #54bis , Oct. 3, 2008,R1-083668.

Samsung, Control Signaling for Non-Contiguous UL Resource Allocations ,3GPP TSG RAN WG1 #58,3GPP,Aug. 28, 2009,R1-093391.

Taiwan Search Report—TW099134440—TIPO—Jan. 29, 2014.

ZTE , Uplink Non-contiguous Resource Allocation for LTE-Advanced ,3GPP TSG RAN WG1 Meeting #58,3GPP,Aug. 28, 2009,R1-093205.

Taiwan Search Report—TW099134440—TIPO—Apr. 21, 2013.

* cited by examiner

UPLINK RESOURCE ALLOCATION FOR LTE ADVANCED

The present application claims priority to U.S. Provisional Patent Application Ser. No. 61/249,911 entitled "LTE-A Uplink Resource Allocation," filed Oct. 8, 2009, the entirety of which is hereby incorporated by reference. The present application also claims priority to U.S. Provisional Patent Application Ser. No. 61/255,440, entitled "LTE-A Uplink Resource Allocation," filed Oct. 27, 2009, the entirety of which is hereby incorporated by reference.

FIELD OF INVENTION

The present invention relates generally to the field of wireless communications and, more particularly, to the allocation of time-frequency resources in a wireless communication system.

BACKGROUND

This section is intended to provide a background or context to the disclosed embodiments. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

In Release 8 (Rel-8) and Release 9 (Rel-9) of the 3GPP LTE specifications, the allocation of time-frequency resources in the uplink between a mobile device (user equipment, UE) and a base station (evolved Node B, eNodeB) are communicated to the mobile device via downlink control information (DCI) in physical downlink control channels (PDCCHs). Only one DCI format (format 0) is specified for this purpose and the protocol for resource allocation is limited to contiguous resource allocations based on a starting resource block (RB) location within a transmission bandwidth and a count of contiguous RBs from the starting location.

It is proposed for LTE-Advanced (LTE-A), that noncontiguous (i.e., multi-cluster) resource allocation be supported on an uplink component carrier. However, no resource allocation protocol has been specified.

SUMMARY

The disclosed embodiments relate to systems, methods, apparatus and computer program products for allocating uplink channel resources in a downlink control channel of a wireless communication system.

According to one disclosed embodiment, a method includes receiving downlink control information (DCI) in a downlink control channel, where the downlink control information is configured to indicate an allocation of uplink resources with a clustered uplink resource allocation protocol or a contiguous uplink resource allocation protocol, detecting which of the clustered uplink resource allocation protocol and the contiguous uplink resource allocation protocol is indicated, and allocating the uplink resources based on the indicated uplink resource allocation protocol.

In one aspect, the downlink control information indicates clustered uplink resource allocation and uplink multiple-input, multiple output (MIMO) operation.

In one aspect, detecting the clustered uplink resource allocation protocol comprises interpreting one or more indicators in a DCI format to distinguish the clustered uplink resource allocation protocol from the contiguous uplink resource allocation protocol.

In another aspect, detecting the clustered uplink resource allocation protocol comprises interpreting different DCI formats to distinguish the clustered uplink resource protocol from the contiguous uplink resource allocation protocol.

In one aspect, the clustered uplink resource allocation protocol includes an allocation of two or more clusters with an allocation resolution of one resource block group, wherein each resource block group comprises 1, 2, 3 or 4 resource blocks based on a system bandwidth.

In another aspect, a DCI format, configured to schedule a clustered uplink resource allocation, is sized to match a DCI format size configured for a downlink resource allocation protocol.

In another aspect, a downlink transmission mode and an uplink transmission mode are separately configured.

In yet another aspect, the clustered uplink resource allocation protocol includes an allocation of 2 or more clusters with an allocation resolution of one resource block group, wherein each resource block group comprises 1, 2, 3 or 4 resource blocks and wherein resource block groups are allocated over less than a full system bandwidth.

In still another aspect, the clustered uplink resource allocation protocol corresponds to a clustered downlink resource allocation protocol.

In one embodiment, a method includes transmitting downlink control information (DCI) in a downlink control channel, the downlink control information configured to indicate an allocation of uplink resources with a clustered uplink resource allocation protocol or a contiguous uplink resource allocation protocol, where the downlink control information is configured to indicate clustered uplink resource allocation and uplink multiple-input, multiple output (MIMO) operation, and where the downlink control information is formatted to size-match a DCI format configured for a downlink resource allocation protocol.

Other disclosed embodiments include apparatus and computer program products for performing the disclosed methods. These and other features of various embodiments, together with the organization and manner of operation thereof, will become apparent from the following detailed description when taken in conjunction with the accompanying drawings, in which like reference numerals are used to refer to like parts throughout.

BRIEF DESCRIPTION OF THE DRAWINGS

Provided embodiments are illustrated by way of example, and not of limitation, in the figures of the accompanying drawings in which.

DETAILED DESCRIPTION

Figure 1:
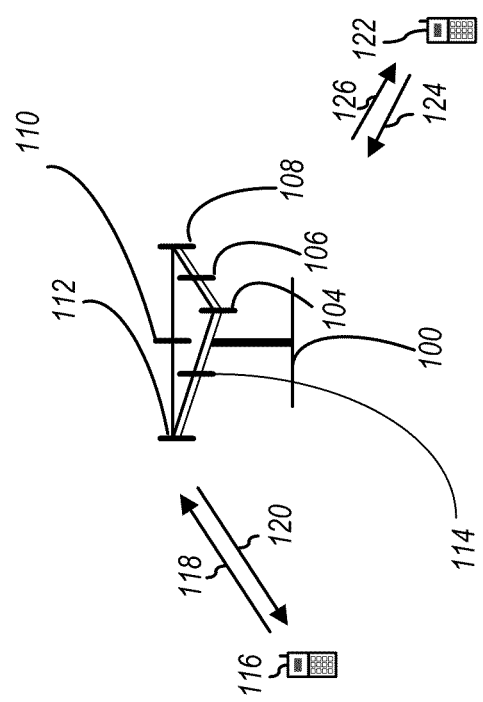
FIG. 1 illustrates a wireless communication system.

In the following description, for purposes of explanation and not limitation, details and descriptions are set forth in order to provide a thorough understanding of the various disclosed embodiments. However, it will be apparent to those skilled in the art that the various embodiments may be practiced in other embodiments that depart from these details and descriptions.

As used herein, the terms "component," "module," "system" and the like are intended to refer to a computer-related entity, either hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, certain embodiments are described herein in connection with a user equipment. A user equipment can also be called a user terminal, and may contain some or all of the functionality of a system, subscriber unit, subscriber station, mobile station, mobile wireless terminal, mobile device, node, device, remote station, remote terminal, terminal, wireless communication device, wireless communication apparatus or user agent. A user equipment can be a cellular telephone, a cordless telephone, a Session Initiation Protocol (SIP) phone, a smart phone, a wireless local loop (WLL) station, a personal digital assistant (PDA), a laptop, a hand-held communication device, a handheld computing device, a satellite radio, a wireless modem card and/or another processing device for communicating over a wireless system. Moreover, various aspects are described herein in connection with a base station. A base station may be utilized for communicating with one or more wireless terminals and can also be called, and may contain some or all of the functionality of, an access point, node, Node B, evolved NodeB (eNB) or some other network entity. A base station communicates over the air-interface with wireless terminals. The communication may take place through one or more sectors. The base station can act as a router between the wireless terminal and the rest of the access network, which can include an Internet Protocol (IP) network, by converting received air-interface frames to IP packets. The base station can also coordinate management of attributes for the air interface, and may also be the gateway between a wired network and the wireless network.

Various aspects, embodiments or features will be presented in terms of systems that may include a number of devices, components, modules, and the like. It is to be understood and appreciated that the various systems may include additional devices, components, modules, and so on, and/or may not include all of the devices, components, modules and so on, discussed in connection with the figures. A combination of these approaches may also be used.

Additionally, in the subject description, the word "exemplary" is used to mean serving as an example, instance or illustration. Any embodiment or design described herein as "exemplary" is not necessarily to be construed as preferred or advantageous over other embodiments or designs. Rather, use of the word exemplary is intended to present concepts in a concrete manner.

The various disclosed embodiments may be incorporated into a communication system. In one example, such communication system utilizes an orthogonal frequency division multiplex (OFDM) that effectively partitions the overall system bandwidth into multiple ($N_F$) subcarriers, which may also be referred to as frequency sub-channels, tones or frequency bins. For an OFDM system, the data to be transmitted (i.e., the information bits) is first encoded with a particular coding scheme to generate coded bits, and the coded bits are further grouped into multi-bit symbols that are then mapped to modulation symbols. Each modulation symbol corresponds to a point in a signal constellation defined by a particular modulation scheme (e.g., M-PSK or M-QAM) used for data transmission. At each time interval, which may be dependent on the bandwidth of each frequency subcarrier, a modulation symbol may be transmitted on each of the $N_F$ frequency subcarriers. Thus, OFDM may be used to combat inter-symbol interference (ISI) caused by frequency selective fading, which is characterized by different amounts of attenuation across the system bandwidth.

Generally, a wireless multiple-access communication system can simultaneously support communication for multiple wireless terminals. Each terminal communicates with one or more base stations through transmissions on the forward and reverse links. The forward link (or downlink) refers to the communication link from the base stations to the terminals, and the reverse link (or uplink) refers to the communication link from the terminals to the base stations. This communication link can be established through a single-in-single-out, multiple-in-single-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized. A MIMO system also supports time division duplex (TDD) and frequency division duplex (FDD) systems. In a TDD system, the forward and reverse link transmissions are on the same frequency region so that the reciprocity principle allows the estimation of the forward link channel from the reverse link channel. This enables the base station to extract transmit beamforming gain on the forward link when multiple antennas are available at the base station.

FIG. 1 illustrates a wireless communication system within which the various disclosed embodiments may be implemented. A base station 100 may include multiple antenna groups, and each antenna group may comprise one or more antennas. For example, if the base station 100 comprises six antennas, one antenna group may comprise a first antenna 104 and a second antenna 106, another antenna group may comprise a third antenna 108 and a fourth antenna 110, while a third group may comprise a fifth antenna 112 and a sixth antenna 114. It should be noted that while each of the above-noted antenna groups were identified as having two antennas, more or fewer antennas may be utilized in each antenna group.

Referring back to FIG. 1, a first user equipment 116 is illustrated to be in communication with, for example, the fifth antenna 112 and the sixth antenna 114 to enable the transmission of information to the first user equipment 116 over a first forward link 120, and the reception of information from the first user equipment 116 over a first reverse link 118. FIG. 1 also illustrates a second user equipment 122 that is in communication with, for example, the third antenna 108 and the fourth antenna 110 to enable the transmission of information to the second user equipment 122 over a second forward link 126, and the reception of information from the second user equipment 122 over a second reverse link 124. In a Frequency Division Duplex (FDD) system, the communication links 118, 120, 124 126 that are shown in FIG. 1 may use different frequencies for communication. For example, the first forward link 120 may use a different frequency than that used by the first reverse link 118.

In some embodiments, each group of antennas and/or the area in which they are designed to communicate is often referred to as a sector of the base station. For example, the different antenna groups that are depicted in FIG. 1 may be designed to communicate to the user equipment in a sector of the base station 100. In communication over the forward links 120 and 126, the transmitting antennas of the base station 100 utilize beamforming in order to improve the signal-to-noise ratio of the forward links for the different user equipment 116 and 122. Also, a base station that uses beamforming to transmit to user equipment scattered randomly throughout its coverage area causes less interference to user equipment in the neighboring cells than a base station that transmits omni-directionally through a single antenna to all its user equipment.

The communication networks that may accommodate some of the various disclosed embodiments may include logical channels that are classified into Control Channels and Traffic Channels. Logical control channels may include a broadcast control channel (BCCH), which is the downlink channel for broadcasting system control information, a paging control channel (PCCH), which is the downlink channel that transfers paging information, a multicast control channel (MCCH), which is a point-to-multipoint downlink channel used for transmitting multimedia broadcast and multicast service (MBMS) scheduling and control information for one or several multicast traffic channels (MTCHs). Generally, after establishing radio resource control (RRC) connection, MCCH is only used by the user equipments that receive MBMS. Dedicated control channel (DCCH) is another logical control channel that is a point-to-point bi-directional channel transmitting dedicated control information, such as user-specific control information used by the user equipment having an RRC connection. Common control channel (CCCH) is also a logical control channel that may be used for random access information. Logical traffic channels may comprise a dedicated traffic channel (DTCH), which is a point-to-point bi-directional channel dedicated to one user equipment for the transfer of user information. Also, a multicast traffic channel (MTCH) may be used for point-to-multipoint downlink transmission of traffic data.

The communication networks that accommodate some of the various embodiments may additionally include logical transport channels that are classified into downlink (DL) and uplink (UL). The DL transport channels may include a broadcast channel (BCH), a downlink shared data channel (DL-SDCH), a multicast channel (MCH) and a Paging Channel (PCH). The UL transport channels may include a random access channel (RACH), a request channel (REQCH), an uplink shared data channel (UL-SDCH) and a plurality of physical channels. The physical channels may also include a set of downlink and uplink channels.

In some disclosed embodiments, the downlink physical channels may include at least one of a common pilot channel (CPICH), a synchronization channel (SCH), a common control channel (CCCH), a shared downlink control channel (SDCCH), a multicast control channel (MCCH), a shared uplink assignment channel (SUACH), an acknowledgement channel (ACKCH), a downlink physical shared data channel (DL-PSDCH), an uplink power control channel (UPCCH), a paging indicator channel (PICH), a load indicator channel (LICH), a physical broadcast channel (PBCH), a physical control format indicator channel (PCFICH), a physical downlink control channel (PDCCH), a physical hybrid ARQ indicator channel (PHICH), a physical downlink shared channel (PDSCH) and a physical multicast channel (PMCH). The uplink physical channels may include at least one of a physical random access channel (PRACH), a channel quality indicator channel (CQICH), an acknowledgement channel (ACKCH), an antenna subset indicator channel (ASICH), a shared request channel (SREQCH), an uplink physical shared data channel (UL-PSDCH), a broadband pilot channel (BPICH), a physical uplink control channel (PUCCH) and a physical uplink shared channel (PUSCH).

Further, the following terminology and features may be used in describing the various disclosed embodiments:
3G 3rd Generation
3GPP 3rd Generation Partnership Project
ACLR Adjacent channel leakage ratio
ACPR Adjacent channel power ratio
ACS Adjacent channel selectivity
ADS Advanced Design System
AMC Adaptive modulation and coding
A-MPR Additional maximum power reduction
ARQ Automatic repeat request
BCCH Broadcast control channel
BTS Base transceiver station
CCE Channel Control Element
CDD Cyclic delay diversity
CCDF Complementary cumulative distribution function
CDMA Code division multiple access
CFI Control format indicator
Co-MIMO Cooperative MIMO
CP Cyclic prefix
CPICH Common pilot channel
CPRI Common public radio interface
CQI Channel quality indicator
CRC Cyclic redundancy check
DCI Downlink control indicator
DFT Discrete Fourier transform
DFT-SOFDM Discrete Fourier transform spread OFDM
DL Downlink (base station to subscriber transmission)

DL-SCH Downlink shared channel
DSP Digital signal processing
DT Development toolset
DVSA Digital vector signal analysis
EDA Electronic design automation
E-DCH Enhanced dedicated channel
E-UTRAN Evolved UMTS terrestrial radio access network
eMBMS Evolved multimedia broadcast multicast service
eNB Evolved Node B
EPC Evolved packet core
EPRE Energy per resource element
ETSI European Telecommunications Standards Institute
E-UTRA Evolved UTRA
E-UTRAN Evolved UTRAN
EVM Error vector magnitude
FDD Frequency division duplex
FFT Fast Fourier transform
FRC Fixed reference channel
FS1 Frame structure type 1
FS2 Frame structure type 2
GSM Global system for mobile communication
HARQ Hybrid automatic repeat request
HDL Hardware description language
HI HARQ indicator
HSDPA High speed downlink packet access
HSPA High speed packet access
HSUPA High speed uplink packet access
IFFT Inverse FFT
IOT Interoperability test
IP Internet protocol
LO Local oscillator
LTE Long term evolution
MAC Medium access control
MBMS Multimedia broadcast multicast service
MBSFN Multicast/broadcast over single-frequency network
MCH Multicast channel
MCS Modulation and Coding Scheme
MIMO Multiple input multiple output
MISO Multiple input single output
MME Mobility management entity
MOP Maximum output power
MPR Maximum power reduction
MU-MIMO Multiple user MIMO
NAS Non-access stratum
OBSAI Open base station architecture interface
OFDM Orthogonal frequency division multiplexing
OFDMA Orthogonal frequency division multiple access
PAPR Peak-to-average power ratio
PAR Peak-to-average ratio
PBCH Physical broadcast channel
P-CCPCH Primary common control physical channel
PCFICH Physical control format indicator channel
PCH Paging channel
PDCCH Physical downlink control channel
PDCP Packet data convergence protocol
PDSCH Physical downlink shared channel
PHICH Physical hybrid ARQ indicator channel
PHY Physical layer
PRACH Physical random access channel
PMCH Physical multicast channel
PMI Pre-coding matrix indicator
P-SCH Primary synchronization signal
PUCCH Physical uplink control channel
PUSCH Physical uplink shared channel
RB Resource Block
RBG Resource Block Group
RE Resource Element
REG Resource Element Group
RNTI Radio Network Temporary Identifier.

Figure 2:
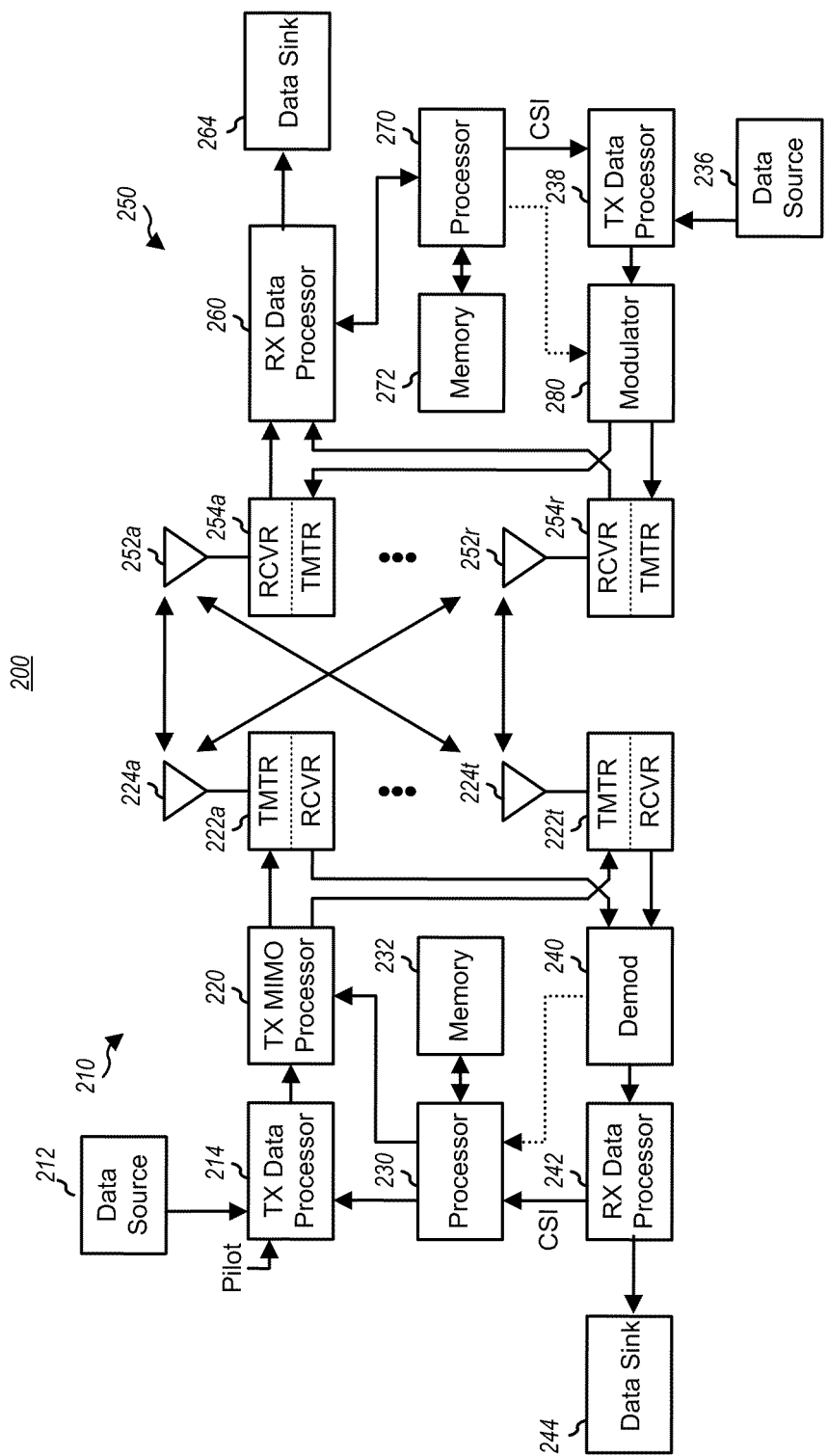
FIG. 2 illustrates a block diagram of a communication system.

FIG. 2 illustrates a block diagram of an exemplary communication system that may accommodate the various embodiments. The MIMO communication system 200 that is depicted in FIG. 2 comprises a transmitter system 210 (e.g., a base station or access point) and a receiver system 250 (e.g., an access terminal or user equipment) in a MIMO communication system 200. It will be appreciated by one of ordinary skill that even though the base station is referred to as a transmitter system 210 and a user equipment is referred to as a receiver system 250, as illustrated, embodiments of these systems are capable of bi-directional communications. In that regard, the terms "transmitter system 210" and "receiver system 250" should not be used to imply single directional communications from either system. It should also be noted the transmitter system 210 and the receiver system 250 of FIG. 2 are each capable of communicating with a plurality of other receiver and transmitter systems that are not explicitly depicted in FIG. 2. At the transmitter system 210, traffic data for a number of data streams is provided from a data source 212 to a transmit (TX) data processor 214. Each data stream may be transmitted over a respective transmitter system. The TX data processor 214 formats, codes and interleaves the traffic data for each data stream, based on a particular coding scheme selected for that data stream, to provide the coded data.

The coded data for each data stream may be multiplexed with pilot data using, for example, OFDM techniques. The pilot data is typically a known data pattern that is processed in a known manner and may be used at the receiver system to estimate the channel response. The multiplexed pilot and coded data for each data stream is then modulated (symbol mapped) based on a particular modulation scheme (e.g., BPSK, QSPK, M-PSK or M-QAM) selected for that data stream to provide modulation symbols. The data rate, coding and modulation for each data stream may be determined by instructions performed by a processor 230 of the transmitter system 210.

In the exemplary block diagram of FIG. 2, the modulation symbols for all data streams may be provided to a TX MIMO processor 220, which can further process the modulation symbols (e.g., for OFDM). The TX MIMO processor 220 then provides $N_T$ modulation symbol streams to $N_T$ transmitter system transceivers (TMTR) 222a through 222t. In one embodiment, the TX MIMO processor 220 may further apply beamforming weights to the symbols of the data streams and to the antenna from which the symbol is being transmitted.

Each transmitter system transceiver 222a through 222t receives and processes a respective symbol stream to provide one or more analog signals, and further condition the analog signals to provide a modulated signal suitable for transmission over the MIMO channel. In some embodiments, the conditioning may include, but is not limited to, operations such as amplification, filtering, up-conversion and the like. The modulated signals produced by the transmitter system transceivers 222a through 222t are then transmitted from the transmitter system antennas 224a through 224t that are shown in FIG. 2.

At the receiver system 250, the transmitted modulated signals may be received by the receiver system antennas 252a through 252r, and the received signal from each of the receiver system antennas 252a through 252r is provided to a respective receiver system transceiver (RCVR) 254a through 254r. Each receiver system transceiver 254a through 254r conditions a respective received signal, digitizes the conditioned signal to provide samples and may further processes the samples to provide a corresponding "received" symbol stream. In some embodiments, the conditioning may include, but is not limited to, operations such as amplification, filtering, down-conversion and the like.

An RX data processor 260 then receives and processes the symbol streams from the receiver system transceivers 254a through 254r based on a particular receiver processing technique to provide a plurality of "detected" symbol streams. In one example, each detected symbol stream can include symbols that are estimates of the symbols transmitted for the corresponding data stream. The RX data processor 260 then, at least in part, demodulates, de-interleaves and decodes each detected symbol stream to recover the traffic data for the corresponding data stream. The processing by the RX data processor 260 may be complementary to that performed by the TX MIMO processor 220 and the TX data processor 214 at the transmitter system 210. The RX data processor 260 can additionally provide processed symbol streams to a data sink 264.

In some embodiments, a channel response estimate is generated by the RX data processor 260 and can be used to perform space/time processing at the receiver system 250, adjust power levels, change modulation rates or schemes, and/or other appropriate actions. Additionally, the RX data processor 260 can further estimate channel characteristics such as signal-to-noise (SNR) and signal-to-interference ratio (SIR) of the detected symbol streams. The RX data processor 260 can then provide estimated channel characteristics to a processor 270. In one example, the RX data processor 260 and/or the processor 270 of the receiver system 250 can further derive an estimate of the "operating" SNR for the system. The processor 270 of the receiver system 250 can also provide channel state information (CSI), which may include information regarding the communication link and/or the received data stream. This information, which may contain, for example, the operating SNR and other channel information, may be used by the transmitter system 210 (e.g., base station or eNodeB) to make proper decisions regarding, for example, the user equipment scheduling, MIMO settings, modulation and coding choices and the like. At the receiver system 250, the CSI that is produced by the processor 270 is processed by a TX data processor 238, modulated by a modulator 280, conditioned by the receiver system transceivers 254a through 254r and transmitted back to the transmitter system 210. In addition, a data source 236 at the receiver system 250 can provide additional data to be processed by the TX data processor 238.

In some embodiments, the processor 270 at the receiver system 250 may also periodically determine which pre-coding matrix to use. The processor 270 formulates a reverse link message comprising a matrix index portion and a rank value portion. The reverse link message may comprise various types of information regarding the communication link and/or the received data stream. The reverse link message is then processed by the TX data processor 238 at the receiver system 250, which may also receive traffic data for a number of data streams from the data source 236. The processed information is then modulated by a modulator 280, conditioned by one or more of the receiver system transceivers 254a through 254r, and transmitted back to the transmitter system 210.

In some embodiments of the MIMO communication system 200, the receiver system 250 is capable of receiving and processing spatially multiplexed signals. In these systems, spatial multiplexing occurs at the transmitter system 210 by multiplexing and transmitting different data streams on the transmitter system antennas 224a through 224t. This is in contrast to the use of transmit diversity schemes, where the same data stream is sent from multiple transmitter systems antennas 224a through 224t. In a MIMO communication system 200 capable of receiving and processing spatially multiplexed signals, a precode matrix is typically used at the transmitter system 210 to ensure the signals transmitted from each of the transmitter system antennas 224a through 224t are sufficiently decorrelated from each other. This decorrelation ensures that the composite signal arriving at any particular receiver system antenna 252a through 252r can be received and the individual data streams can be determined in the presence of signals carrying other data streams from other transmitter system antennas 224a through 224t.

Since the amount of cross-correlation between streams can be influenced by the environment, it is advantageous for the receiver system 250 to feed back information to the transmitter system 210 about the received signals. In these systems, both the transmitter system 210 and the receiver system 250 contain a codebook with a number of precoding matrices. Each of these precoding matrices can, in some instances, be related to an amount of cross-correlation experienced in the received signal. Since it is advantageous to send the index of a particular matrix rather than the values in the matrix, the feedback control signal sent from the receiver system 250 to the transmitter system 210 typically contains the index of a particular precoding matrix. In some instances the feedback control signal also includes a rank index which indicates to the transmitter system 210 how many independent data streams to use in spatial multiplexing.

Other embodiments of MIMO communication system 200 are configured to utilize transmit diversity schemes instead of the spatially multiplexed scheme described above. In these embodiments, the same data stream is transmitted across the transmitter system antennas 224a through 224t. In these embodiments, the data rate delivered to receiver system 250 is typically lower than spatially multiplexed MIMO communication systems 200. These embodiments provide robustness and reliability of the communication channel. In transmit diversity systems each of the signals transmitted from the transmitter system antennas 224a through 224t will experience a different interference environment (e.g., fading, reflection, multi-path phase shifts). In these embodiments, the different signal characteristics received at the receiver system antennas 252a through 254r are useful in determining the appropriate data stream. In these embodiments, the rank indicator is typically set to 1, telling the transmitter system 210 not to use spatial multiplexing.

Other embodiments may utilize a combination of spatial multiplexing and transmit diversity. For example in a MIMO communication system 200 utilizing four transmitter system antennas 224a through 224t, a first data stream may be transmitted on two of the transmitter system antennas 224a through 224t and a second data stream transmitted on remaining two transmitter system antennas 224a through 224t. In these embodiments, the rank index is set to an integer lower than the full rank of the precode matrix, indicating to the transmitter system 210 to employ a combination of spatial multiplexing and transmit diversity.

At the transmitter system 210, the modulated signals from the receiver system 250 are received by the transmitter system antennas 224a through 224t, are conditioned by the transmitter system transceivers 222a through 222t, are demodulated by a transmitter system demodulator 240, and are processed by the RX data processor 242 to extract the reserve link message transmitted by the receiver system 250. In some embodiments, the processor 230 of the transmitter system 210 then determines which pre-coding matrix to use for future forward link transmissions, and then processes the extracted message. In other embodiments, the processor 230 uses the received signal to adjust the beamforming weights for future forward link transmissions.

In other embodiments, a reported CSI can be provided to the processor 230 of the transmitter system 210 and used to determine, for example, data rates as well as coding and modulation schemes to be used for one or more data streams. The determined coding and modulation schemes can then be provided to one or more transmitter system transceivers 222a through 222t at the transmitter system 210 for quantization and/or use in later transmissions to the receiver system 250. Additionally and/or alternatively, the reported CSI can be used by the processor 230 of the transmitter system 210 to generate various controls for the TX data processor 214 and the TX MIMO processor 220. In one example, the CSI and/or other information processed by the RX data processor 242 of the transmitter system 210 can be provided to a data sink 244.

In some embodiments, the processor 230 at the transmitter system 210 and the processor 270 at the receiver system 250 may direct operations at their respective systems. Additionally, a memory 232 at the transmitter system 210 and a memory 272 at the receiver system 250 can provide storage for program codes and data used by the transmitter system processor 230 and the receiver system processor 270, respectively. Further, at the receiver system 250, various processing techniques can be used to process the $N_R$ received signals to detect the $N_T$ transmitted symbol streams. These receiver processing techniques can include spatial and space-time receiver processing techniques, which can include equalization techniques, "successive nulling/equalization and interference cancellation" receiver processing techniques, and/or "successive interference cancellation" or "successive cancellation" receiver processing techniques.

As noted above, LTE Rel-8 only supports contiguous resource allocation (known as Type 2 resource allocation) on the physical uplink shared channel (PUSCH) between a UE and an eNodeB and the uplink resource allocation function is reserved to DCI format 0 in a physical downlink control channel (PDCCH). DCI format 0 is one of 10 different downlink control information formats supported in LTE Rel-8 and which are carried in PDCCHs.

Figure 3:
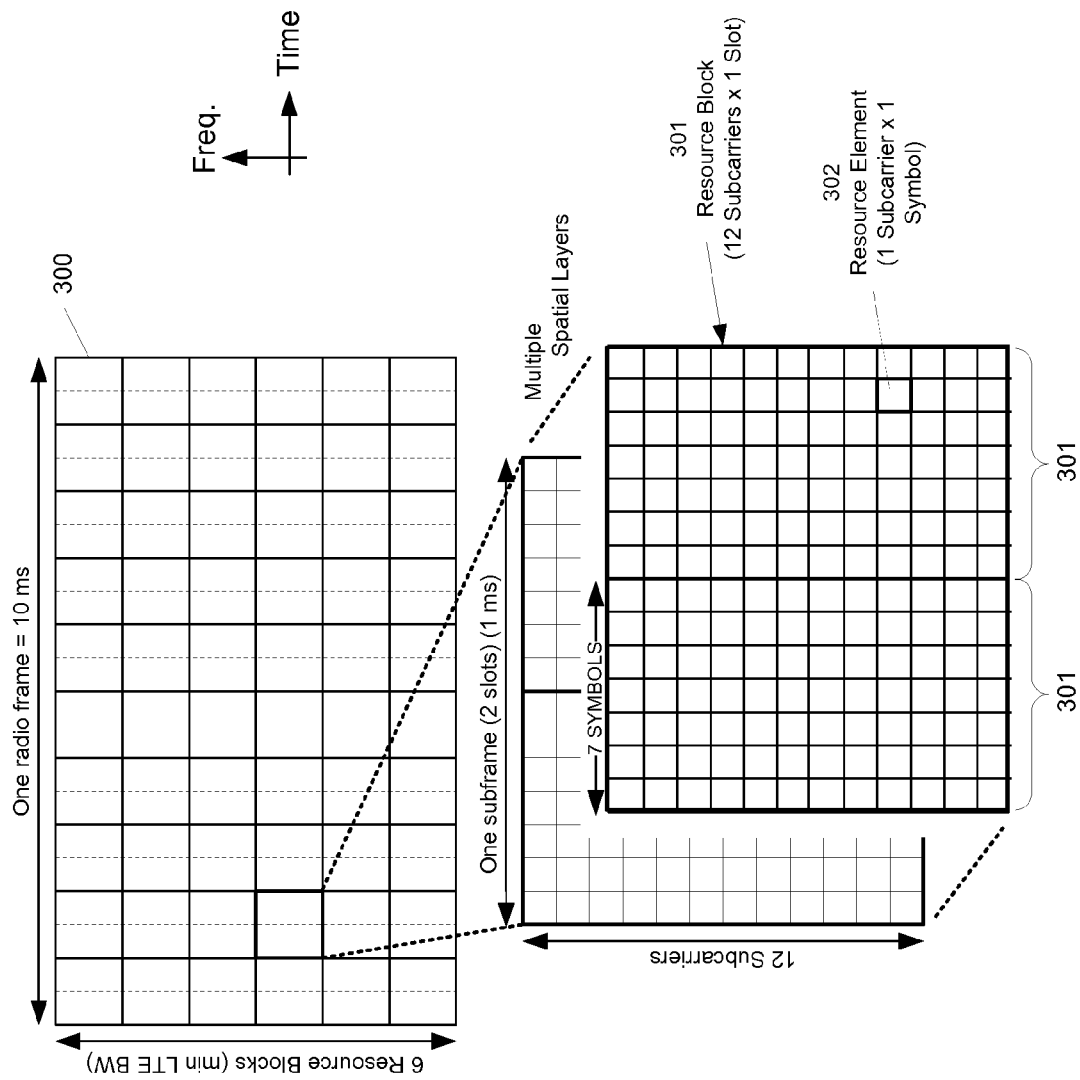
FIG. 3 illustrates time-frequency resource allocations.

The basic time-frequency resource in LTE is the resource block (RB), which spans one slot (0.5 milliseconds) in the time domain and either 12 contiguous OFDM (orthogonal frequency division multiplex) subcarriers on the downlink at 15 KHz intervals, or 12 contiguous SC-FDMA (single-carrier, frequency division multiple access) signals on the uplink (also at 15 KHz intervals). As a result, each RB spans a 180 KHz bandwidth. FIG. 3 illustrates the basic time-frequency design of LTE. A radio frame 300 has a duration of 10 milliseconds (ms) and spans a number of resource blocks (RBs) 301 in the frequency domain and ten 1 ms subframes in the time domain. The total number of RBs used for any LTE transmission is proportional to the system bandwidth (BW). For example, a 5 MHz system bandwidth requires 25 RBs; while a 10 MHz system bandwidth requires 50 RBs (each transmission BW includes upper and lower guard bands). The minimum system bandwidth specified for LTE Rel-8 is 1.4 MHz (6 RBs) as illustrated in FIG. 3, and the maximum specified transmission bandwidth is 20 MHZ (110 RBs). Each resource block 301 spans 6 or 7 OFDM symbols on the downlink or SC-FDMA symbols on the uplink (7 shown in FIG. 3). The smallest unit of resource is a resource element 302, which spans one subcarrier in the frequency domain and 1 symbol in the time domain. The number of bits per symbol is a function of the modulation scheme and can vary from 2 bits per symbol (QPSK modulation) to 6 bits per symbol (64 QAM). In some transmission modes, resources may be spatially mutiplexed in two of more layers.

Figure 4:
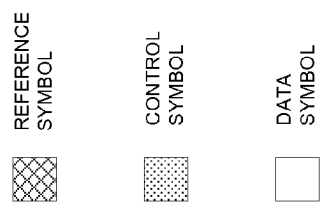
FIG. 4 illustrates a distribution of control, data and reference symbols in one embodiment.
Figure 4:
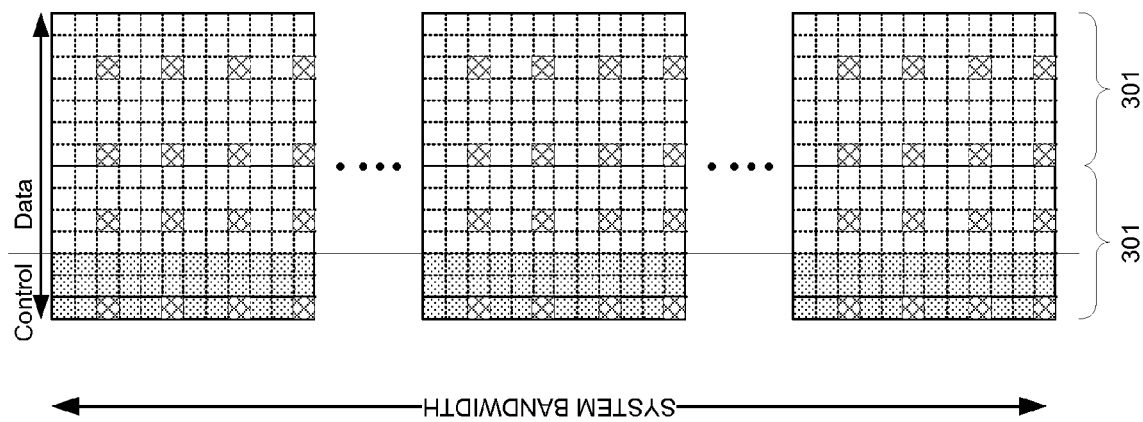

Resource allocation for the physical uplink shared channel (PUSCH), also known as uplink scheduling grants, are controlled by signaling in physical downlink control channels (PDCCHs) in the first 1, 2 or 3 OFDM symbols in a downlink subframe (up to 4 for narrow band systems), extending over substantially the entire system bandwidth, as illustrated in FIG. 4, excluding demodulation reference signals. The balance of each downlink subframe, excluding demodulation reference symbols, comprises the physical downlink shared channel (PDSCH), which is used for data transmission.

The first OFDM symbol in a subframe includes a control format indicator channel (CFICH) carrying a control format indicator (CFI) that indicates the number of OFDM symbols used for transmission of control channel information in each subframe. The CFI is coded as 32 bits, which are mapped to 16 resource elements (REs) as QPSK symbols. In order to achieve frequency diversity, the 16 REs carrying the PCFICH are distributed across the frequency domain according to a predetermined pattern so the UE can always locate the PCFICH.

A PDCCH carries a message known as downlink control information (DCI), which includes resource assignments as well as other information for a UE or group of UEs. Several PDCCHs can be transmitted in a subframe. Each PDCCH is transmitted using one or more control channel elements (CCEs), where each CCE corresponds to nine sets of four REs called resource element groups (REGs). Four QPSK symbols are mapped to each REG.

Four PDCCH aggregation levels (groupings) of CCEs are supported in LTE Rel-8, as illustrated in Table 1.

TABLE 1

| CCE Aggregation Level | No. of REGs | No. of PDCCH coded Bits |
|---|---|---|
| 1 | 9 | 72 |
| 2 | 18 | 144 |
| 4 | 36 | 288 |
| 8 | 72 | 576 |

Figure 5:
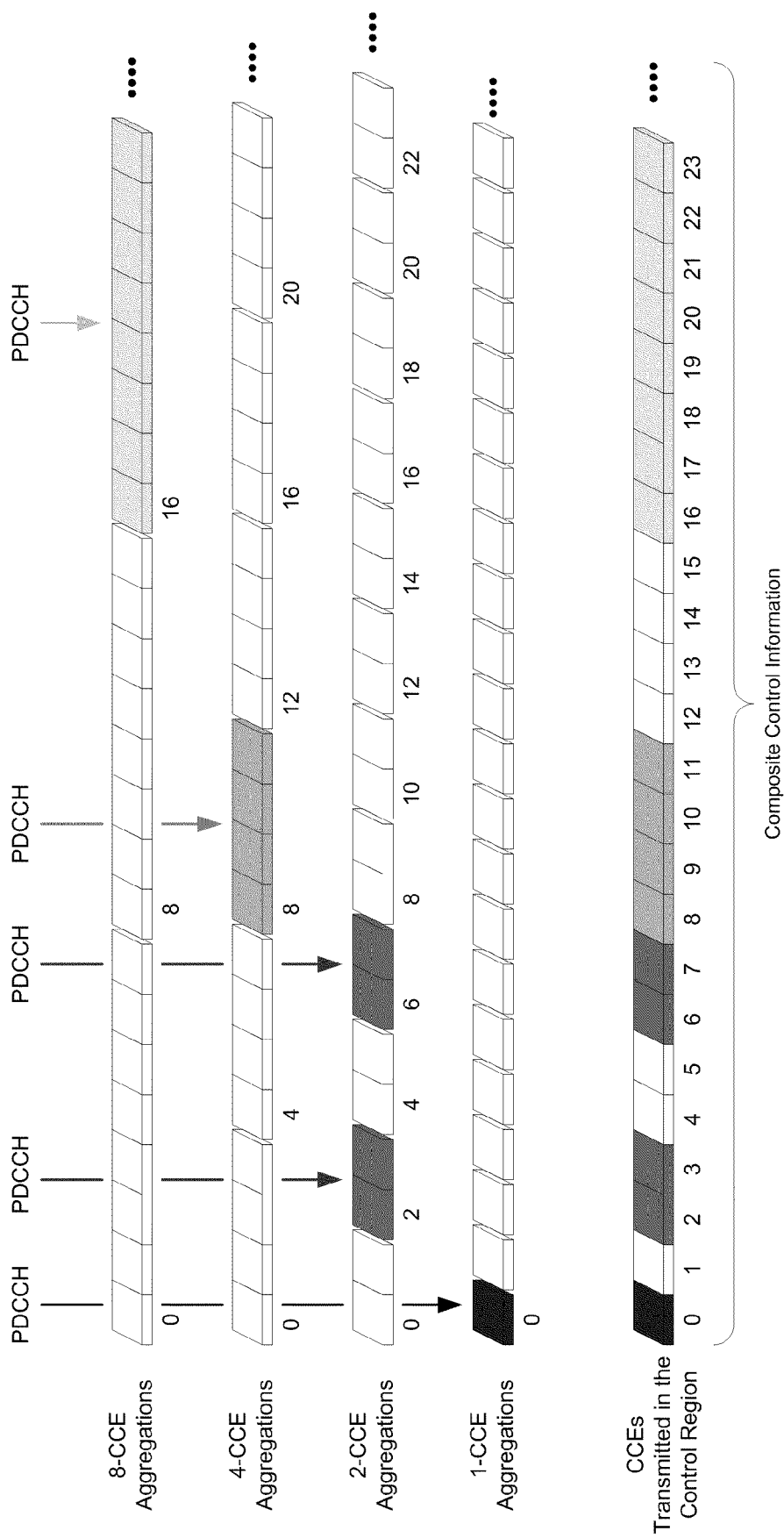
FIG. 5 illustrates aggregation of control channel elements in one embodiment.

CCEs are numbered and used consecutively. To simplify the decoding process (PDCCHs are encoded with cell-specific or UE-specific scrambling codes), a PDCCH with a format consisting of N CCEs may only start with a CCE with a number equal to a multiple of N, as illustrated in FIG. 5. The number of CCEs used for transmission of a particular PDCCH is determined by the eNodeB based on channel conditions.

The format and content of DCI messages is a function of the transmission mode selected by the eNodeB. LTE Rel-8 specifies 7 downlink transmission modes and 10 DCI formats. Table 2 identifies the 7 LTE Rel-8 transmissions modes and Table 3 identifies the 10 LTE Rel-8 DCI formats.

TABLE 2

| DL Transmission Mode | Description |
|---|---|
| 1 | Transmission from a single eNobeB antenna port. |
| 2 | Transmit diversity. |
| 3 | Open-loop spatial multiplexing. |
| 4 | Closed-loop spatial multiplexing. |

TABLE 2-continued

| DL Transmission Mode | Description |
| --- | --- |
| 5 | Multi-user MIMO. |
| 6 | Closed-loop rank 1 precoding. |
| 7 | Transmission with UE specific reference signals. |

TABLE 3

| DCI Format | Purpose | Number of bits in a 50 RB BW & 4 eNB antennas. |
| --- | --- | --- |
| 0 | PUSCH resource grants. | 42 |
| 1 | PDSCH assignment with a single codeword. | 47 |
| 1A | PDSCH assignments in compact format. | 42 |
| 1B | PDSCH assignments for rank-1 transmission. | 46 |
| 1C | PDSCH assignments in very compact format. | 26 |
| 1D | PDSCH assignments for multi-user MIMO. | 46 |
| 2 | PDSCH assignments for closed-loop MIMO operation. | 62 |
| 2A | PDSCH assignments for open-loop MIMO operation. | 58 |
| 3 | PUCCH & PUSCH transmit power control (TPC) for multiple UEs with 2-bit power adjustment. | 42 |
| 3A | PUCCH & PUSCH transmit power control (TPC) for multiple UEs with 1-bit power adjustment. | 42 |

The exemplary bit lengths listed in Table 3 are inclusive of a 16-bit CRC appended to each PDCCH that allows a UE to determine that the PDCCH transmission has been received correctly. Additionally, each CRC is scrambled with a cell-specific or UE-specific code, a radio network temporary identifier (RNTI) that is known to the UE and enables the UE to decode messages that are intended for it.

In each subframe, PDCCHs indicate the frequency domain resource allocations for the uplink and downlink. LTE Rel-8 specifies several types of resource allocations.

Direct Bitmap:

Used for downlink resource allocations, the bitmap allocates one RB per bit and is used for bandwidths less than 10 RBs. The number of bits required is $N_{RB}$, the number of resource blocks.

Resource Allocation Type 0:

Used for downlink resource allocations, the bitmap addresses Resource Block Groups (RBGs) that are allocated to the scheduled UE, where a RBG is a set of consecutive RBs. The group size P (1, 2, 3, 4) depends on the system bandwidth (P=1 for BW<10 RBs, P=2 for BW 11-26 RBs, P=3 for BW 27-63 RBs and P=4 for BW 64-110 RBs). The number of bits required is $N_{RB}/P$.

Resource Allocation Type 1:

Used for downlink resource allocations to address individual RBs within a subset of available RBGs, and shift bits to indicate the RBG subset. The total number of bits required is the same as Type 0 (i.e., $N_{RB}/P$).

Resource Allocation Type 2:

Used for both uplink and downlink resource allocation (and the only RA protocol designated in Rel-8 for uplink resource allocation), the RA information indicates to a scheduled UE a set of contiguously allocated RBs. RB allocations may vary from a single RB up to a maximum number of RBs spanning the system bandwidth. A Type 2 resource allocation field consists of a resource indication value (RIV) corresponding to a starting resource block number ($RB_{START}$) and a length in terms of contiguously-allocated resource blocks ($L_{CRBs}$). For instance, the RIV for the downlink is defined as:

if $(L_{CRBs}-1) \leq \lfloor N_{RB}^{DL}/2 \rfloor$, then $RIV = N_{RB}^{DL}(L_{CRBs}-1) + RB_{START}$;

else $RIV = N_{RB}^{DL}(N_{RB}^{DL} - L_{CRBs} + 1) + (N_{RB}^{DL} - 1 - RB_{START})$;

where $N_{RB}^{DL}$ is the number of downlink resource blocks. The number of bits required for Type 2 resource allocation is given by:

ceiling$[\log_2(N_{RB}(N_{RB}+1)/2)]$

Figure 6:
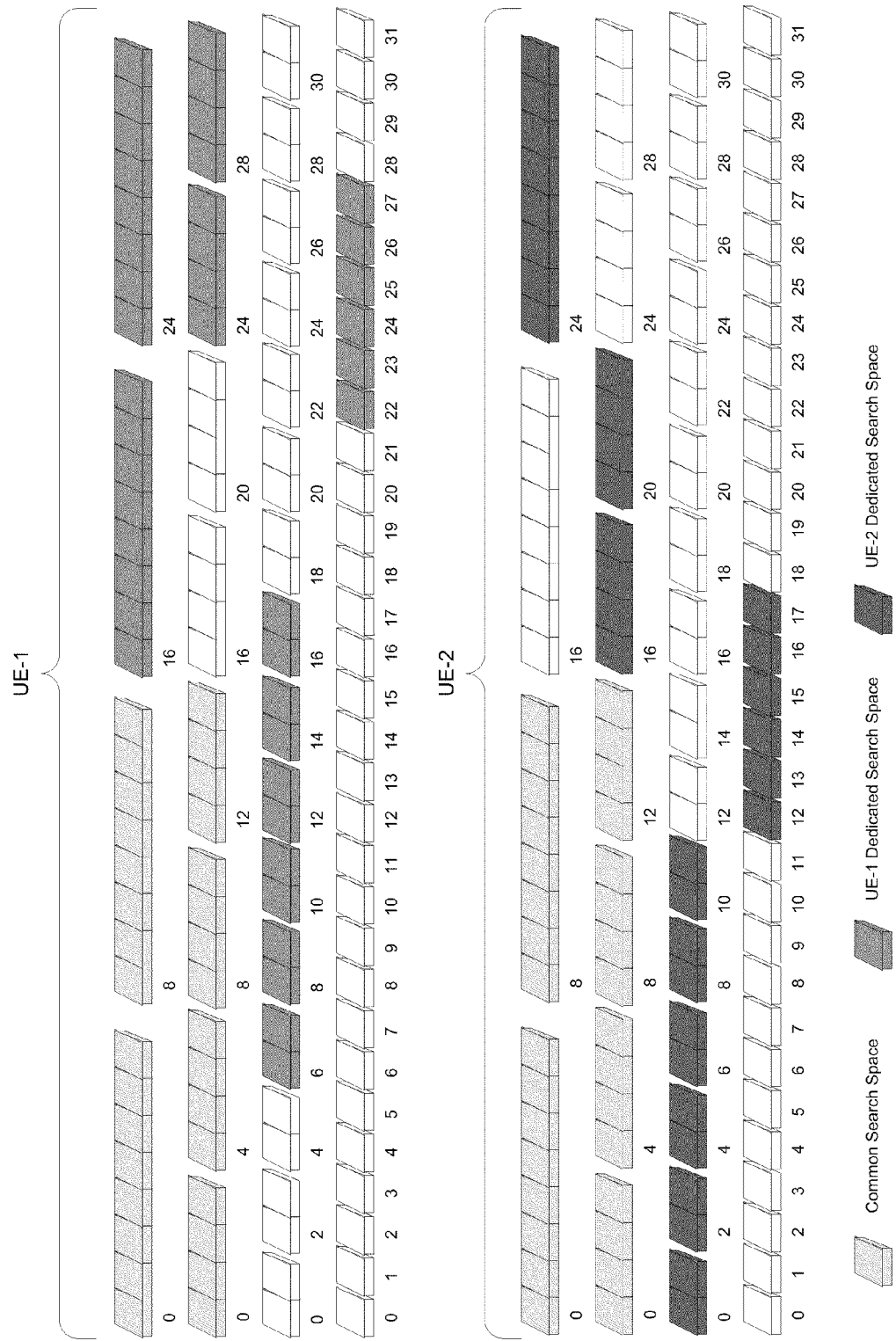
FIG. 6 illustrates common and dedicated search spaces in one exemplary embodiment.

In LTE Rel-8, each UE is assigned a limited set of CCE locations where a PDCCH may be placed. The set of candidate PDCCH locations, formed by a set of CCEs of a given aggregation level (1, 2, 4 or 8), is called a "search space." Separate dedicated and common search spaces are defined, where a dedicated search space is configured for each UE individually, while all UEs are informed of the extent of the common search space. The dedicated and common search spaces for a given UE may overlap. FIG. 6 illustrates an exemplary assignment of search spaces to two UEs served by the same eNodeB. In each subframe, a UE attempts to decode all the PDCCHs that can be formed from the CCEs in each of its search spaces, using its assigned RNTI. If the CRC is verified, then the content of the PDCCH is validated for the UE and the UE processes the control information.

In order to limit the total number of blind decode attempts and the associated computational load, a UE is required to search for only two different DCI format sizes in each search space. In the common search space, for all DL transmission modes (1-7), the UE searches for DCI format 0 and DCI format 1A, which are always the same size (distinguished by a flag bit), and for DCI format 1C (the UE may also search for DCI formats 3 and 3A in the common search space, which are the same size as formats 0 and 1A, but are used for power control, not for resource allocation). The number of candidate locations in the common search space is limited to 6 locations: 4 locations with aggregation levels of 4 CCEs and 2 locations with aggregation levels of 8 CCEs. In the dedicated search space, for all DL transmission modes, the UE also searches for DCI formats 0 and 1A. The second DCI format size that the UE searches for depends on the DL transmission mode. For transmission modes 1, 2 and 7 (see Table 2), the UE searches for DCI format 1. In transmission modes 3, 4, 5 and 6, the UE searches respectively for DCI formats 2A, 2, 1D and 1B. The number of candidate locations in the dedicated search space is limited to 16 locations: 6 locations at an aggregation level of 1 CCE, 6 locations at an aggregation level of 2 CCEs, 2 locations at an aggregation level of 4 CCEs and 2 locations at an aggregation level of 8 CCEs. The relation among search spaces, transmission modes, DCI formats and candidate locations for LTE Rel-8 is summarized in Table 4.

TABLE 4

| Search Space | DL Tx Mode | DCI Size 1 | DCI Size 2 |
| --- | --- | --- | --- |
| Common | 1 to 7 | 0/1A | 1C |
| Dedicated | 1, 2 & 7 | 0/1A | 1 |
|  | 3 | 0/1A | 2A |
|  | 4 | 0/1A | 2 |
|  | 5 | 0/1A | 1D |
|  | 6 | 0/1A | 1B |

As a result of the constraints on the number of DCI format sizes (2 in each search space) and the number of candidate locations (6 in the common search space and 16 in the dedicated search space, the number of blind decodes that the UE must perform is limited to 44 [2×(6+16)].

As noted above, the only DCI format in LTE Rel-8 that supports resource allocation on the PUSCH is DCI format 0, and the resource allocation protocol in format 0 is limited to contiguous resource allocation. To support non-contiguous (clustered) resource allocation on the uplink in LTE-A, a new resource allocation protocol is needed.

One design issue is how to combine the new resource allocation protocol with the support of single-user MIMO (SU-MIMO) operation on the uplink, which will be supported in LTE-A. If support of the new resource allocation protocol and support of uplink SU-MIMO are not jointly considered, two separate DCI formats become necessary for these two features. If the two DCI formats are of distinct sizes, this may increase the number of blind PDCCH decodes. Thus, if a UE is configured in the uplink SU-MIMO mode, the UE should be able to schedule both SU-MIMO operation and the new resource allocation protocol simultaneously using one single DCI.

Another issue is the support of the new resource allocation and the legacy LTE Rel-8 contiguous resource allocation. For a UE capable of clustered uplink resource allocation, it is still desirable for the UE to be able to be assigned an LTE Rel-8 single-carrier waveform based uplink resource allocation. This is because the contiguous resource allocation provides a superior uplink cubic-metric (CM) property and is beneficial for link-budget limited UEs. Additionally, enabling Rel-8 resource allocation facilitates the scheduling of new UEs and legacy UEs (which support only contiguous resource allocation) in one subframe. Thus, a UE capable of clustered uplink resource allocation should be able to be scheduled with the new resource allocation protocol and the Rel-8 legacy resource allocation protocol in a dynamic manner. This dual scheduling capability can be enabled by two different DCIs. Alternatively, the two resource allocation protocols can be conveyed via a single DCI, with one-bit differentiating the resource allocation protocol in use.

One design issue in multi-cluster resource allocation is whether the number of clusters should be explicitly limited. The number of clusters has an impact on the uplink cubic metric (CM), a parameter related to the peak-to-average power ratio transmitted by the UE, which should be as low as possible. Generally, increasing the number of clusters increases the CM (negative impact), but the marginal increase in CM decreases as the number of clusters grows. The number of clusters also impacts scheduling efficiency in terms of UL bandwidth utilization. Generally, scheduling efficiency increases as the number of clusters increases. Finally, the number of clusters impacts the complexity of resource allocation signaling on the downlink (PDCCH). In the following description, examples of multi-cluster resource allocation are given using 2 clusters for convenience. However, it is contemplated that one or more embodiments disclosed herein may be used to address resource allocation protocols for two or more clusters without an explicit upper limit.

New UL resource allocation signaling for multi-cluster resource allocation requires the design of new DCI formats. Regardless of the specific designs, it is desirable to implement the new DCI format(s) without increasing the total number of blind decodes above the number (44) used in LTE Rel-8. Any increase in the number of blind decodes would result in additional UE complexity and increase the probability of false detections (a 16-bit CRC has a false-detection probability of $2^{-16}$). False negative detections have a negative impact on performance by causing unintended uplink transmissions (e.g., erroneous ACK/NACK signally and PUSCH scheduling).

There are at least two options for structuring new DCI formats to support UL multi-cluster resource allocation and UL SU-MIMO. For convenience, let the new DCI format be designated as format 0' (read "0 prime"). In one option, DCI format 0' may replace DCI format 0, in which case it may be distinguished from DCI format 1A by the same 1-bit flag used in Rel-8 to distinguish format 0 from format 1A. In another option, DCI format 0' may be added while formats 0 and 1A are maintained, in which case the three formats may be distinguished by a 2-bit flag. In either case, if multi-cluster resource allocation in DCI format 0' requires more bits than format 0 or format 1A, then the latter formats may be zero-padded to match the size of DCI format 0'.

In LTE Rel-8, DCI format 0 contains the following information in the order specified:

A flag for differentiating format 0 from format 1A (because the two formats are always forced to be the same size): 1 bit A flag to indicate PUSCH frequency hopping: 1 bit Resource block assignment and hopping resource allocation: $[\log_2(N_{RB}^{UL}(N_{RB}^{UL}+1)/2)]-N_{UL}^{HO}$ bits, where $N_{RB}^{UL}$ is the number of assigned contiguous resource blocks and $N_{UL}^{HO}$ is the number of bits used to designate hopping (1 bit for $N_{RB}^{UL}<50$ or 2 bits for $N_{RB}^{UL}\geq50$)

MCS (modulation and coding scheme): 5 bits

HARQ process number: 3 bits (FDD), 4 bits (TDD)

New data indicator: 1 bit

Redundancy version: 2 bits

TPC (transmitter power control) command for PUCCH: 2 bits

DAI (downlink assignment index) for TDD UL/DL configurations 1-6: 2 bits

Zero padding bits as required to match format 1A (if format 1A is larger)

In one embodiment, the design of the resource allocation protocol (RA signaling) for DCI format 0' may re-use the RA field bits and/or the frequency hopping flag in DCI format 0 in a joint manner. The total number of resource allocation bits and the frequency hopping flag bit may then be used to accommodate the number of resource indication values (RIVs) provided by DCI format 0'. As noted above, the number of bits used for resource allocation in Rel-8 DCI format 0 is given by:

$$\text{ceiling}[\log_2(N_{RB}(N_{RB}+1)/2)].$$

In the following description, the expression C(n, k), read as "n choose k," is used to represent the function $$\frac{n!}{k!(n-k)!},$$

which is the number of combinations of k elements that can be selected from a set of n elements without repetitions. For example, there are C(10, 2)=45 ways of selecting a starting RB and an ending RB (2 RBs) from a set of 10 RBs to define every possible contiguous cluster of RBs from length 2 to length 10. There are C(10,4)=210 ways of selecting two sets of starting and ending RBs from a set of 10 RBs to define all possible ways of forming 2 clusters. If repetitions are allowed (e.g., selecting the same element multiple times to include groups of length 1 to k−1), then the number of possible combinations is given by:

C(n+1,k)

In one embodiment, a design for a DCI format 0' to allocate N resource blocks provides 1 RB resolution for multi-cluster (e.g., 2 cluster) resource allocation, single-cluster resource allocation without hopping combinations and single-cluster resource allocation with hopping combinations. The total number of combinations, allowing repetitions, is given by $C(N_{RB}+1, 4)+2*C(N_{RB}+1, 2)$. Table 5 lists the corresponding number of resource allocation bits required for bandwidths from 6 RBs (1.4 MHz) to 100 RBs (20 MHz).

TABLE 5

| $N_{RB}$ | 6 | 15 | 25 | 50 | 75 | 100 |
|---|---|---|---|---|---|---|
| Combinations | 77 | 2060 | 15600 | 252450 | 1288675 | 4093025 |
| RA Bits Req'd | 7 | 12 | 14 | 18 | 21 | 22 |
| Bits available in Rel-8 (RA + hopping flag) | 6 | 8 | 10 | 12 | 13 | 14 |
| Additional Bits Required | 1 | 4 | 4 | 6 | 8 | 8 |

In another embodiment, a design for a DCI format 0' provides 1 RB resolution for Rel-8 type resource allocation (single cluster) with and without frequency hopping, and resource block group (RBG) resolution for 2 clusters with RBG size P corresponding to LTE Rel-8 DL Type 0/1 resource allocation (P=1 for $N_{RB}$<10, P=2 for 11≤$N_{RB}$≤26 RBs, P=3 for 27≤$N_{RB}$≤63 and P=4 for 64≤$N_{RB}$≤110 RBs). The total number of combinations is given by C[ceiling(N/P)+1, 4]+2*C(N+1, 2). Table 6 lists the corresponding number of resource allocation bits required for bandwidths from 6 RBs to 100 RBs.

TABLE 6

| $N_{RB}$ | 6 | 15 | 25 | 50 | 75 | 100 |
|---|---|---|---|---|---|---|
| P | 1 | 2 | 2 | 3 | 4 | 4 |
| Combinations | 65 | 366 | 1651 | 5610 | 10545 | 25050 |
| RA Bits Req'd | 7 | 9 | 11 | 13 | 14 | 15 |
| Bits available in Rel-8 | 6 | 8 | 10 | 12 | 13 | 14 |
| Additional Bits Required | 1 | 1 | 1 | 1 | 1 | 1 |

In another embodiment, a design for a DCI format 0' with the same size as LTE Rel-8 DCI format 0 provides 1 RB resolution for single-cluster resource allocation with and without frequency hopping and RBG resolution for 2 cluster allocation, where RBG size P is not tied to LTE Rel-8 downlink allocation size. For 2-cluster resource allocation in this embodiment, RBG size P may be defined as: P=2 for $N_{RB}$<10, P=3 for 11≤$N_{RB}$≤26 RBs, P=4 for 27≤$N_{RB}$≤63 and P=5 for 64≤$N_{RB}$≤110 RBs. The total number of combinations is again given by C[ceiling(N/P)+1, 4]+2*C(N+1, 2), with P redefined. Table 7 lists the corresponding number of resource allocation bits required for bandwidths from 6 RBs to 100 RBs.

TABLE 7

| $N_{RB}$ | 6 | 15 | 25 | 50 | 75 | 100 |
|---|---|---|---|---|---|---|
| P | 2 | 3 | 3 | 4 | 5 | 5 |
| Combinations | 43 | 255 | 860 | 3551 | 7520 | 16085 |
| RA Bits Req'd | 6 | 8 | 10 | 12 | 13 | 14 |
| Bits available | 6 | 8 | 10 | 12 | 13 | 14 |

TABLE 7-continued

| $N_{RB}$ | 6 | 15 | 25 | 50 | 75 | 100 |
|---|---|---|---|---|---|---|
| in Rel-8 Additional Bits Required | 0 | 0 | 0 | 0 | 0 | 0 |

In another embodiment, a design for a DCI format 0' provides 1 RB resolution for Rel-8 type single cluster resource allocation, and RBG resolution for 2 clusters over a partial bandwidth with RBG size P corresponding to LTE Rel-8 DL Type 0/1 resource allocation (P=1 for $N_{RB}$<10, P=2 for 11≤$N_{RB}$≤26 RBs, P=3 for 27≤$N_{RB}$≤63 and P=4 for 64≤$N_{RB}$≤110 RBs). In this embodiment, a bandwidth less than the full system bandwidth is allocated on the PUSCH. This bandwidth reduction is possible because the UE uses PUSCH resource blocks at the band edges for uplink control signaling such as HARQ acknowledgements, scheduling requests and channel status reports, and does not need to be allocated. Table 8 illustrates the number of resource allocation bits required when the allocated bandwidth is 80% of the full bandwidth for 2 cluster allocation. The total number of combinations is given by C[ceiling(N'/P)+1, 4]+2*C(N'+1, 2), where N' is the effective bandwidth (N'=ceiling [0.8*$N_{RB}$]). This embodiment provides for a DCI format 0' that is the same size as DCI format 0 for the majority of bandwidths.

TABLE 8

| $N_{RB}$ | 6 | 15 | 25 | 50 | 75 | 100 |
|---|---|---|---|---|---|---|
| N' | 5 | 12 | 20 | 40 | 60 | 80 |
| P | 1 | 2 | 2 | 3 | 3 | 4 |
| Combinations | 57 | 275 | 980 | 3915 | 7520 | 16085 |
| RA Bits Req'd | 6 | 9 | 10 | 12 | 13 | 14 |
| Bits available in Rel-8 | 6 | 8 | 10 | 12 | 13 | 14 |
| Additional Bits Required | 0 | 1 | 0 | 0 | 0 | 0 |

In an alternative embodiment, a design for a DCI format 0' provides 1 RB resolution for Rel-8 type single cluster resource allocation, and RBG resolution for 2 clusters with RBG size P corresponding to LTE Rel-8 DL Type 0/1 resource allocation (P=1 for N<10, P=2 for 11≤$N_{RB}$≤26 RBs, P=3 for 27≤$N_{RB}$≤63 and P=4 for 64≤$N_{RB}$≤110 RBs). In this embodiment, however, the maximum number of resource blocks assigned for 2 cluster allocations may be limited such that the number of bits required for resource allocation is the same for format 0 and format 0'.

In order to support clustered uplink resource allocation SU-MIMO operation, it may be desirable to define new DCI formats for uplink resource allocation that are based on existing DCI formats that are tied to transmission modes that are associated with spatial multiplexing. The new DCI formats may be defined in addition to DCI format 0' or in place of DCI format 0'. For example, DL transmission modes 3 and 4 for open and closed-loop spatial multiplexing, respectively, are tied to DCI formats 2A and 2 respectively (see Table 4). New UL DCI formats 2' and 2A' may be designed to match the size of DL DCI formats 2 and 2A, therefore not increasing the required number of blind decodes, and providing Type 0 and Type 1 resource allocation on the PUSCH without any limitations. Table 9 illustrates the DCI format structure when formats 0', 2' and 2A' are added to the existing Rel-8 DCI formats.

TABLE 9

| Search Space | DL Tx Mode | DCI Size 1 | DCI Size 2 |
|---|---|---|---|
| Common | 1 to 7 | 0/1A + 0' | 1C |
| Dedicated | 1, 2 & 7 | 0/1A + 0' | 1 |
| | 3 | 0/1A + 0' | 2A + 2A' |
| | 4 | 0/1A + 0' | 2 + 2' |
| | 5 | 0/1A + 0' | 1D |
| | 6 | 0/1A + 0' | 1B |

Alternatively, new DCI formats may be designed to match all of the existing downlink transmission mode dependent DCI formats (1/1B/1D/2/2A). By this method, resource allocation signaling for uplink resource assignments can be made similar to the Type 0 and Type 1 resource allocation signaling when DCI formats 1, 2 and 2A are applicable. DCI formats 1B and 1D provide Type 2 resource allocation (with the addition of a gap parameter), so new DCI formats 1B' and 1D' can be defined similarly to DCI format 0'. DCI formats 1B and 1D are larger than DCI formats 1A and 0 due to the presence of precoding and power control bits. These additional bits are not needed for uplink resource allocation and may be redefined in new formats 1B' and 1D' for additional flexibility in RA signaling. It will be appreciated that a flag bit will be needed in each of the old and new DCI formats to distinguish between uplink and downlink resource allocation. The bit may be re-assigned within the existing formats or newly added. Table 10 illustrates the DCI format structure when formats 0', 1', 1B', 1D', 2' and 2A' are added to the existing Rel-8 DCI formats.

TABLE 10

| Search Space | DL Tx Mode | DCI Size 1 | DCI Size 2 |
|---|---|---|---|
| Common | 1 to 7 | 0/1A + 0' | 1C |
| Dedicated | 1, 2 & 7 | 0/1A + 0' | 1 + 1' |
| | 3 | 0/1A + 0' | 2A + 2A' |
| | 4 | 0/1A + 0' | 2 + 2' |
| | 5 | 0/1A + 0' | 1D + 1D' |
| | 6 | 0/1A + 0' | 1B + 1B' |

This approach supports both multi-cluster signaling and SU-MIMO operation on the uplink. Additionally, it supports LTE Rel-8 signaling for legacy devices, there is no increase in the required number of blind decodes over Rel-8 and there is no explicit restriction on the number of clusters.

In LTE Release 9 (Rel-9), a new DCI format 2B may be introduced to support dual-stream beamforming as part of a new DL transmission mode (Mode 8). It will be appreciated that the approaches described above may be applied equally well to define a new DCI format 2B'.

Linking DCI formats in the manner described above may be interpreted as a bunching of uplink and downlink transmission modes, implying for example, that if a UE is configured for mode 4 (closed-loop spatial multiplexing) in the downlink, the UE is also configured for some form of spatial multiplexing in the uplink.

Alternatively, the configuration of uplink and downlink transmission modes may be independent with the linking of DCI formats relating only to size matching and the constraints on the number of different DCI sizes and search spaces. For example, a UE may be configured with transmission mode 4 in the downlink, and SIMO operation in the uplink, in which case DCI format 2' could be used for SIMO uplink assignments, with format 2' size-matched to format 2. In another example, the UE could be configured with transmission mode 4 on the downlink and configured for SU-MIMO operation on the uplink, in which case DCI format 2' could be used for SU-MIMO uplink assignments (possibly with dynamic rank adaptation) and possibly MU-MIMO assignments.

The DCI format sizes in use for a UE can be driven by the downlink transmission mode or the uplink transmission mode. For example, if the UE is configured with downlink transmission mode 3, then the UE knows that the two DCI format sizes are driven by the sizes of format 1A/0 and format 2 (or a revised version of same if a new bit is defined to distinguish uplink and downlink formats).

It will be appreciated that the modifications to DCI formats described herein may be enabled per specification (i.e., hard-coded, which could be UE category dependent), or by higher layer signaling (e.g., via layer 3) as is known in the art.

Figure 7:
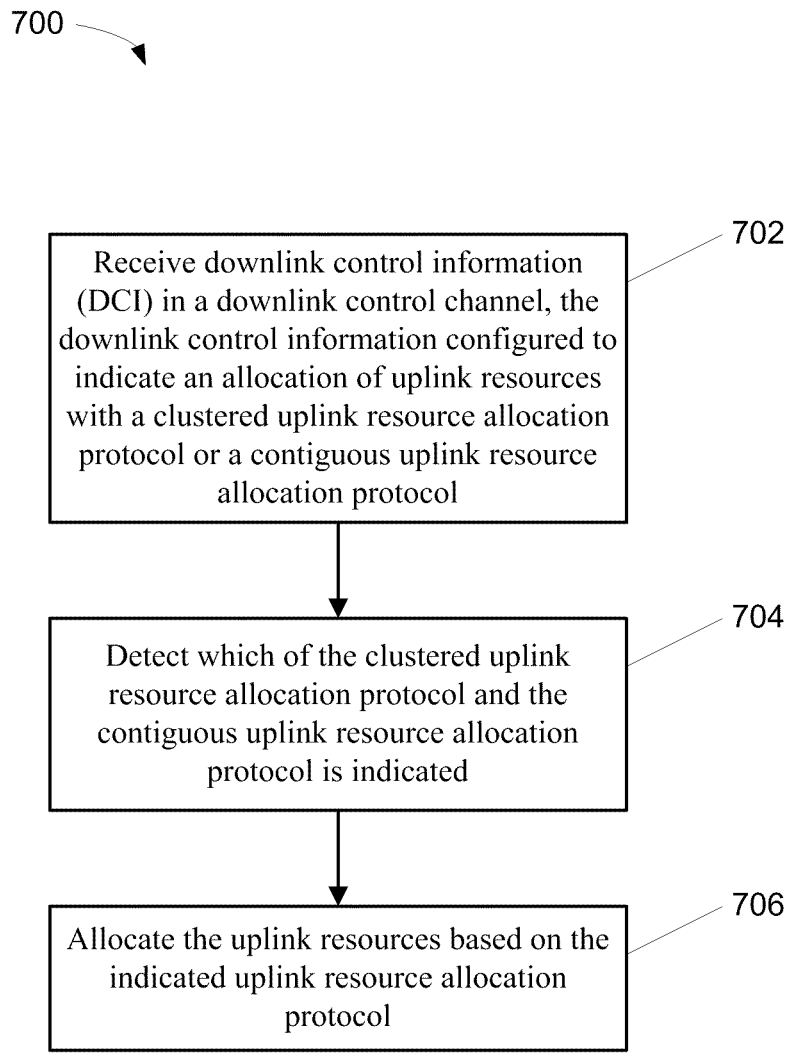
FIG. 7 is a flowchart illustrating a method in one embodiment.

FIG. 7 is a flowchart illustrating a method 700 according to one provided embodiment. For purposes of simplicity of explanation, the method is shown and described as a series of operations. It is to be understood that the method is not limited by the order of operations, as some operations can, in accordance with one or more embodiments, occur in different orders and/or concurrently with other operations from that shown and described herein. For example, those skilled in the art will understand and appreciate that a method could alternatively be represented as a series of interrelated states or events, such as in a state diagram. Moreover, not all illustrated operations may be required to implement a method in accordance with one or more of the disclosed embodiment.

In FIG. 7, the method 700 begins at operation 702, receiving downlink control information (DCI) in a downlink control channel, where the downlink control information is configured to indicate an allocation of uplink resources with a clustered uplink resource allocation protocol or a contiguous uplink resource allocation protocol. At operation 704, the method continues by detecting which of the clustered uplink resource allocation protocol and the contiguous uplink resource allocation protocol is indicated. At operation 706, the method concludes by allocating the uplink resources based on the indicated uplink resource allocation protocol.

Figure 8:
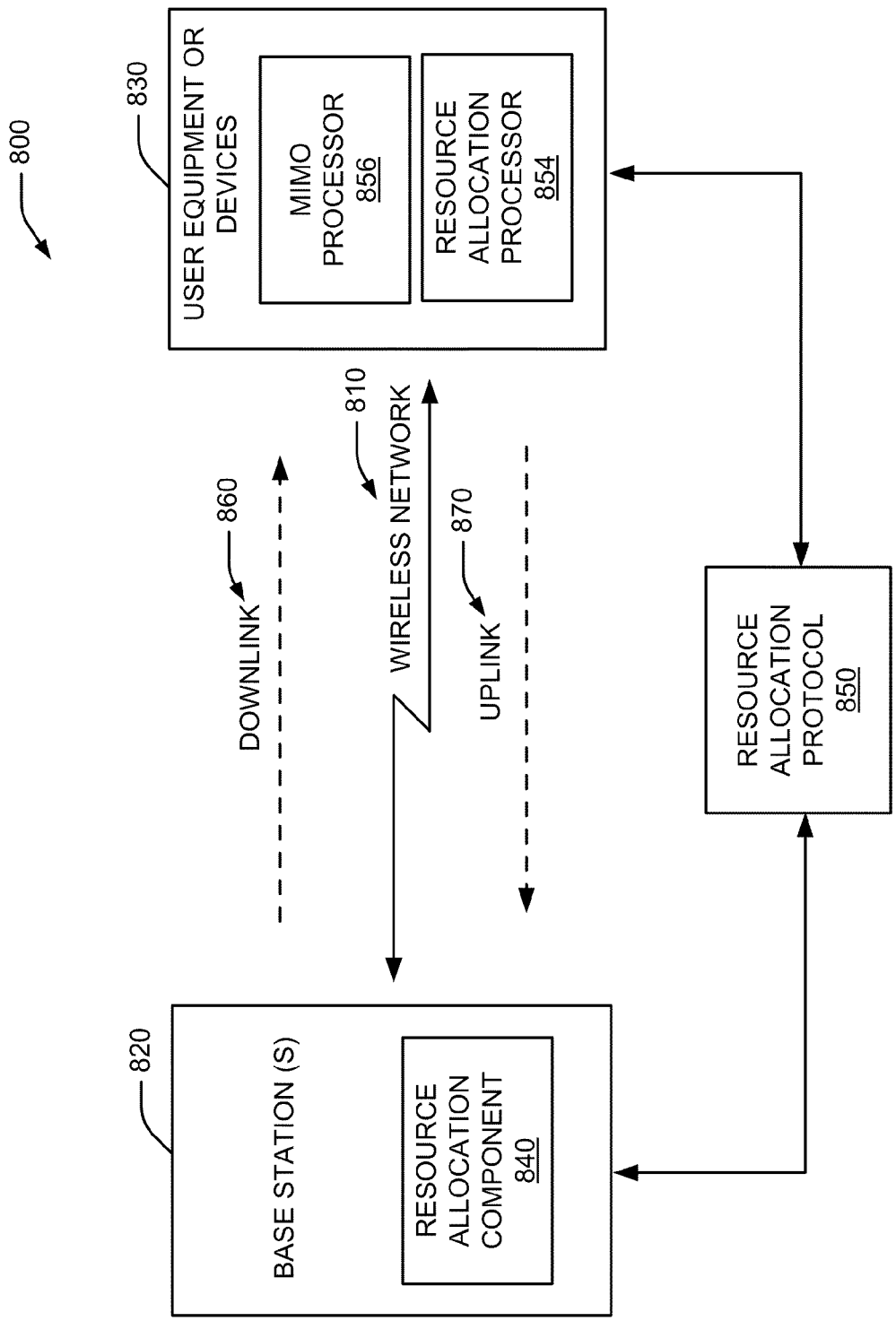
FIG. 8 is a block diagram of a system illustrating uplink and downlink resource allocation in one embodiment.

FIG. 8 illustrates an exemplary system 800 capable of supporting the various operations described above. The system 800 includes a base station 820 that can transmit and/or receive information, signals, data, instructions, commands, bits, symbols and the like. The base station 820 can communicate with a user equipment (UE) 830 via a downlink (forward channel) 860 and an uplink (reverse channel) 870 utilizing a wireless network 810. The UE 830 can transmit and/or receive information, signals, data, instructions, commands, bits, symbols and the like. Moreover, although not shown, it is contemplated that any number of base stations similar to the base station 820 can be included in the system 800 and/or any number of UEs similar to the UE 830 can be included in the system 800.

The base station 820 may include a resource allocation component that communicates a clustered uplink resource allocation protocol 850 to the user equipment 830 via a control channel in the downlink 860. The user equipment 830 may be configured to receive downlink control information (DCI) in a downlink control channel, where the downlink control information is configured to indicate an allocation of uplink resources with a clustered uplink resource allocation protocol or a contiguous uplink resource allocation protocol. The user equipment 830 may include a resource allocation processor 854 configured to detect which of the clustered uplink resource allocation protocol and the contiguous uplink resource allocation protocol is indicated and to allocate the uplink resources based on the indicated uplink resource allocation protocol. The user equipment 830 may also include a MIMO processor 856 configured to process multiple-input, multiple output operations based on a configured transmission mode.

Figure 9:
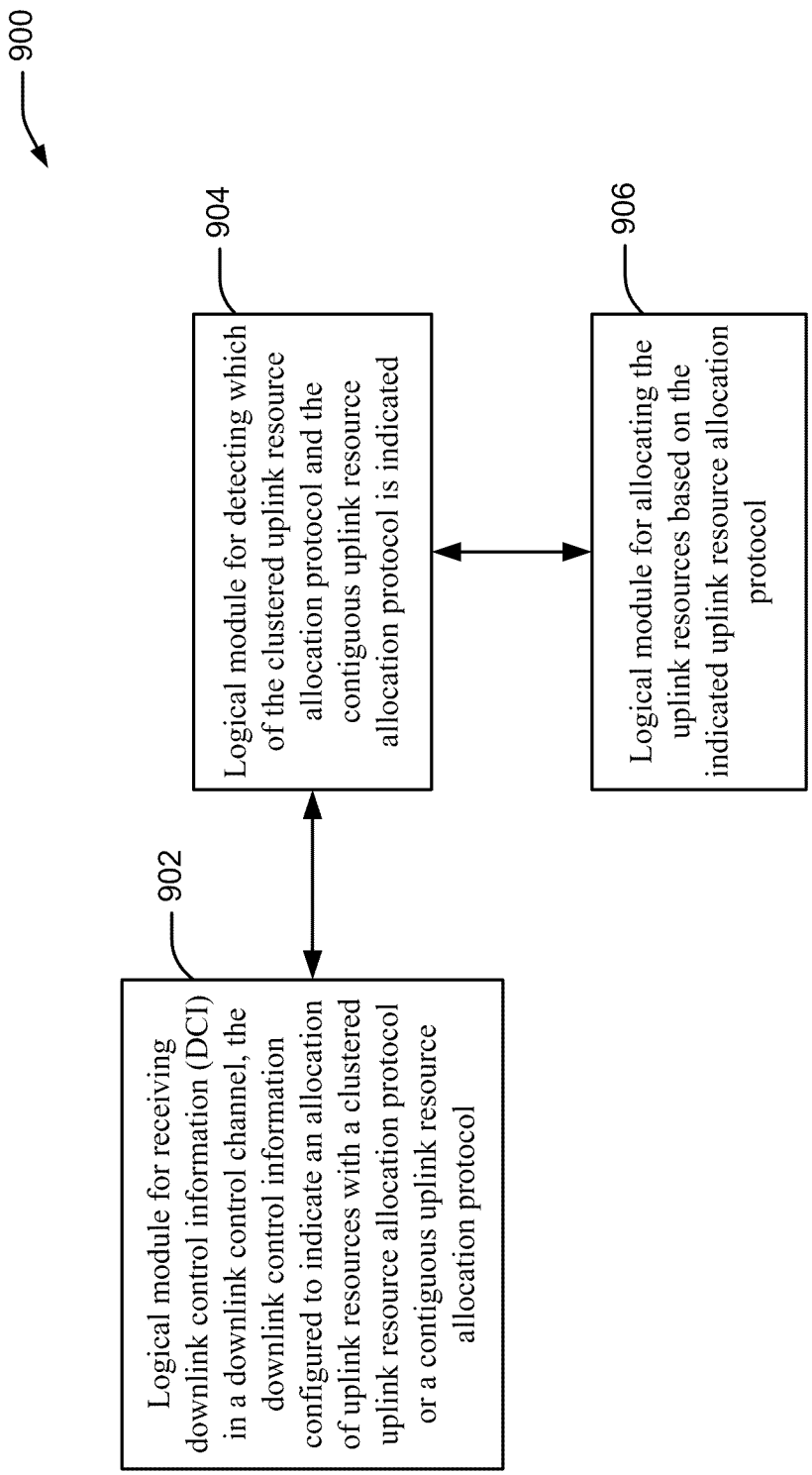
FIG. 9 is a block diagram of a system configured to perform a method according to one embodiment.

FIG. 9 illustrates a wireless communication system 900 in which disclosed embodiments may be practiced. The system 900 includes a logical module 902 configured to receive downlink control information (DCI) in a downlink control channel, where the downlink control information is configured to indicate an allocation of uplink resources with a clustered uplink resource allocation protocol or a contiguous uplink resource allocation protocol. The system 900 also includes a logical module 904 configured to detect which of the clustered uplink resource allocation protocol and the contiguous uplink resource allocation protocol is indicated. The system 900 may also include a logical module 906 configured to allocate uplink resources based on the clustered uplink resource allocation protocol.

Figure 10:
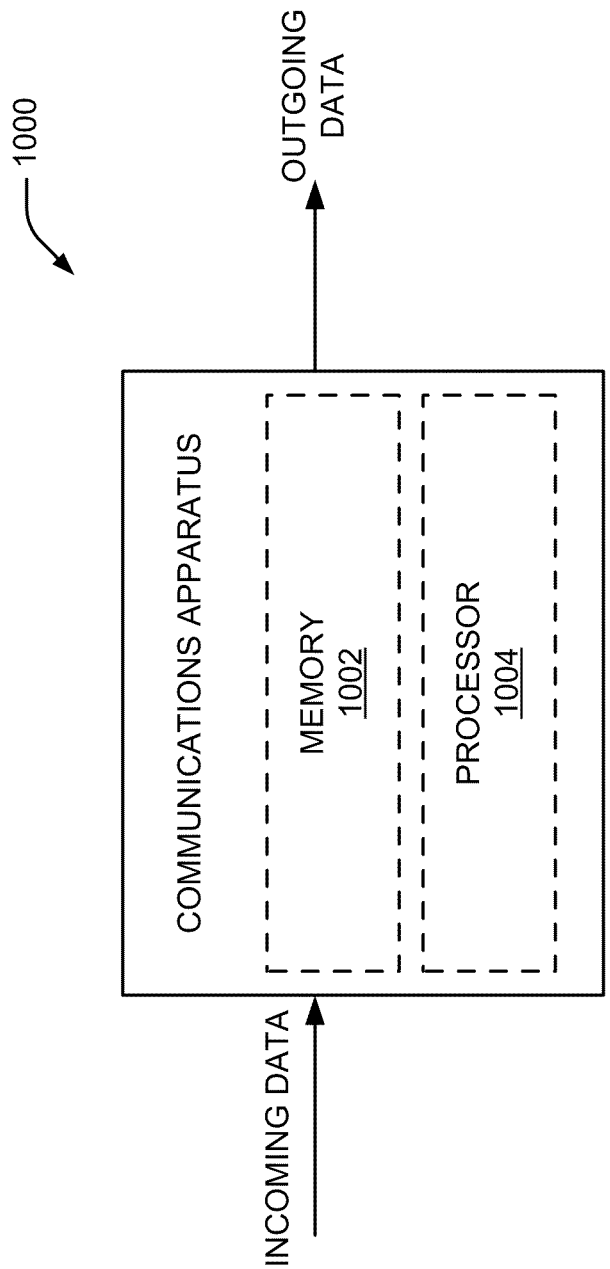
FIG. 10 illustrates a wireless communications apparatus in one embodiment.

FIG. 10 illustrates an apparatus 1000 within which the various disclosed embodiments may be implemented. In particular, the apparatus 1000 that is shown in FIG. 10 may comprise at least a portion of a base station or at least a portion of a user equipment (such as the base station 820 and the user equipment 830 that are depicted in FIG. 8) and/or at least a portion of a transmitter system or a receiver system (such as the transmitter system 210 and the receiver system 250 that are depicted in FIG. 2). The apparatus 1000 that is depicted in FIG. 10 can be resident within a wireless network and receive incoming data via, for example, one or more receivers and/or the appropriate reception and decoding circuitry (e.g., antennas, transceivers, demodulators and the like). The apparatus 1000 that is depicted in FIG. 10 can also transmit outgoing data via, for example, one or more transmitters and/or the appropriate encoding and transmission circuitry (e.g., antennas, transceivers, modulators and the like). Additionally, or alternatively, the apparatus 1000 that is depicted in FIG. 10 may be resident within a wired network.

FIG. 10 further illustrates that the apparatus 1000 can include a memory 1002 that can retain instructions for performing one or more operations, such as signal conditioning, analysis and the like. Additionally, the apparatus 1000 of FIG. 10 may include a processor 1004 that can execute instructions that are stored in the memory 1002 and/or instructions that are received from another device. The instructions can relate to, for example, configuring or operating the apparatus 1000 or a related communications apparatus. It should be noted that while the memory 1002 that is depicted in FIG. 10 is shown as a single block, it may comprise two or more separate memories that constitute separate physical and/or logical units. In addition, the memory while being communicatively connected to the processor 1004, may reside fully or partially outside of the apparatus 1000 that is depicted in FIG. 10. It is also to be understood that one or more components, such as the resource allocation component 840, the resource allocation processor 854 and the MIMO processor 856 that are shown in FIG. 8, can exist within a memory such as memory 1002.

It will be appreciated that the memories that are described in connection with the disclosed embodiments can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM) or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM) and direct Rambus RAM (DRRAM).

It should also be noted that the apparatus 1000 of FIG. 10 can be employed with a user equipment or mobile device, and can be, for instance, a module such as an SD card, a network card, a wireless network card, a computer (including laptops, desktops, personal digital assistants PDAs), mobile phones, smart phones or any other suitable terminal that can be utilized to access a network. The user equipment accesses the network by way of an access component (not shown). In one example, a connection between the user equipment and the access components may be wireless in nature, in which access components may be the base station and the user equipment is a wireless terminal. For instance, the terminal and base stations may communicate by way of any suitable wireless protocol, including but not limited to Time Divisional Multiple Access (TDMA), Code Division Multiple Access (CDMA), Frequency Division Multiple Access (FDMA), Orthogonal Frequency Division Multiplexing (OFDM), FLASH OFDM, Orthogonal Frequency Division Multiple Access (OFDMA) or any other suitable protocol.

Access components can be an access node associated with a wired network or a wireless network. To that end, access components can be, for instance, a router, a switch and the like. The access component can include one or more interfaces, e.g., communication modules, for communicating with other network nodes. Additionally, the access component can be a base station (or wireless access point) in a cellular type network, wherein base stations (or wireless access points) are utilized to provide wireless coverage areas to a plurality of subscribers. Such base stations (or wireless access points) can be arranged to provide contiguous areas of coverage to one or more cellular phones and/or other wireless terminals.

It is to be understood that the embodiments and features that are described herein may be implemented by hardware, software, firmware or any combination thereof. Various embodiments described herein are described in the general context of methods or processes, which may be implemented in one embodiment by a computer program product, embodied in a computer-readable medium, including computer-executable instructions, such as program code, executed by computers in networked environments. As noted above, a memory and/or a computer-readable medium may include removable and non-removable storage devices including, but not limited to, Read Only Memory (ROM), Random Access Memory (RAM), compact discs (CDs), digital versatile discs (DVD) and the like. When implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Generally, program modules may include routines, programs, objects, components, data structures, etc., that perform particular tasks or implement particular abstract data types. Computer-executable instructions, associated data structures and program modules represent examples of program code for executing steps of the methods disclosed herein. The particular sequence of such executable instructions or associated data structures represents examples of corresponding acts for implementing the functions described in such steps or processes.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

For a software implementation, the techniques described herein may be implemented with modules (e.g., procedures, functions and so on) that perform the functions described herein. The software codes may be stored in memory units and executed by processors. The memory unit may be implemented within the processor and/or external to the processor, in which case it can be communicatively coupled to the processor through various means as is known in the art. Further, at least one processor may include one or more modules operable to perform the functions described herein.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., user equipment-to-user equipment) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed embodiments. SC-FDMA has similar performance and essentially a similar overall complexity as those of OFDMA systems. SC-FDMA signal has lower peak-to-average power ratio (PAPR) because of its inherent single carrier structure. SC-FDMA can be utilized in uplink communications where lower PAPR can benefit a user equipment in terms of transmit power efficiency.

Moreover, various aspects or features described herein may be implemented as a method, apparatus or article of manufacture using standard programming and/or engineering techniques. The term "article of manufacture" as used herein is intended to encompass a computer program accessible from any computer-readable device, carrier or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform the functions described herein.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM or any other form of storage medium known in the art. An exemplary storage medium may be coupled to the processor, such that the processor can read information from, and write information to, the storage medium. In the alternative, the storage medium may be integral to the processor. Further, in some embodiments, the processor and the storage medium may reside in an ASIC. Additionally, the ASIC may reside in a user equipment (e.g. 830 FIG. 8). In the alternative, the processor and the storage medium may reside as discrete components in a user equipment. Additionally, in some embodiments, the steps and/or actions of a method or algorithm may reside as one or any combination or set of codes and/or instructions on a machine readable medium and/or computer readable medium, which may be incorporated into a computer program product.

While the foregoing disclosure discusses illustrative embodiments, it should be noted that various changes and modifications could be made herein without departing from the scope of the described embodiments as defined by the appended claims. Accordingly, the described embodiments are intended to embrace all such alterations, modifications and variations that fall within scope of the appended claims. Furthermore, although elements of the described embodiments may be described or claimed in the singular, the plural is contemplated unless limitation to the singular is explicitly stated. Additionally, all or a portion of any embodiment may be utilized with all or a portion of any other embodiments, unless stated otherwise.

To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

What is claimed is:

1. A method in a wireless communication device, comprising:
   receiving downlink control information (DCI) in a downlink control channel, the DCI configured to indicate an allocation of uplink resources with a clustered uplink resource allocation protocol or a contiguous uplink resource allocation protocol;
   detecting which of the clustered uplink resource allocation protocol and the contiguous uplink resource allocation protocol is indicated based on the DCI, wherein the clustered uplink resource allocation protocol comprises an allocation of two or more clusters with an allocation resolution of one resource block group, wherein each resource block group's size depends on a system bandwidth; and
   communicating using the uplink resources based on the indicated uplink resource allocation protocol.

2. The method of claim 1, wherein the downlink control information indicates clustered uplink resource allocation and uplink multiple-input, multiple output (MIMO) operation.

3. The method of claim 1, wherein the two or more clusters is two clusters, and said each resource block group comprises 1, 2, 3 or 4 resource blocks and is based on a system bandwidth.

4. The method of claim 1, wherein a downlink transmission mode and an uplink transmission mode are separately configured.

5. The method of claim 1, wherein the clustered uplink resource allocation protocol comprises an allocation of two or more clusters with an allocation resolution of one resource block group, wherein each resource block group comprises 1, 2, 3 or 4 resource blocks and wherein resource block groups are allocated over less than a full system bandwidth.

6. The method of claim 1, wherein the clustered uplink resource allocation protocol corresponds to a bitmap based downlink resource allocation protocol.

7. The method of claim 1, wherein the contiguous uplink resource allocation protocol is based on an LTE Rel-8 single-carrier waveform.

8. The method of claim 1, wherein the clustered uplink resource allocation protocol is based on an LTE Advanced CL-DFT-S-OFDM (CLustered, Discrete Fourier Transform, Spread Orthogonal Frequency Division Multiplex) waveform.

9. The method of claim 1, wherein decoding the clustered uplink resource allocation protocol does not require more blind decodes than an LTE Rel-8 contiguous uplink resource allocation protocol.

10. An apparatus, comprising:
    means for receiving downlink control information (DCI) in a downlink control channel, the DCI configured to indicate an allocation of uplink resources with a clustered uplink resource allocation protocol or a contiguous uplink resource allocation protocol;
    means for detecting which of the clustered uplink resource allocation protocol and the contiguous uplink resource allocation protocol is indicated based on the DCI, wherein the clustered uplink resource allocation protocol comprises an allocation of two or more clusters with an allocation resolution of one resource block group, wherein each resource block group's size depends on a system bandwidth; and
    means for communicating using the uplink resources based on the indicated uplink resource allocation protocol.

11. The apparatus of claim 10, wherein the downlink control information indicates clustered uplink resource allocation and uplink multiple-input, multiple output (MIMO) operation.

12. A communication device, comprising:
    a processor; and
    a memory comprising processor executable instructions that, when executed by the processor, configures the communication device to:
    receive downlink control information (DCI) in a downlink control channel, the DCI configured to indicate an allocation of uplink resources with a clustered uplink resource allocation protocol or a contiguous uplink resource allocation protocol;
    detect which of the clustered uplink resource allocation protocol and the contiguous uplink resource allocution protocol is indicated based on the DCI, wherein the clustered uplink resource allocation protocol comprises an allocation of two or more clusters with an allocation resolution of one resource block group, wherein each resource block group's size depends on a system bandwidth; and
    communicating using the uplink resources based on the indicated uplink resource allocation protocol.

13. The communication device of claim 12, wherein the downlink control in formation indicates clustered uplink resource allocation and uplink multiple-input, multiple output (MIMO) operation.

14. A computer program product, embodied on a non-transitory computer-readable storage medium, comprising:
    program code for receiving downlink control information (DCI) in a downlink control channel, the DCI configured to indicate an allocation of uplink resources with a clustered uplink resource allocation protocol or a contiguous uplink resource allocation protocol;
    program code for detecting which of the clustered uplink resource allocation protocol and the contiguous uplink resource allocation protocol is indicated based on the DCI, wherein the clustered uplink resource allocation protocol comprises an allocation of two or more clusters with an allocation resolution of one resource block group, wherein each resource block group's size depends on a system bandwidth; and program code for communicating using the uplink resources based on the indicated uplink resource allocation protocol.

15. The computer program product of claim 14, wherein the downlink control information indicates clustered uplink resource allocation and uplink multiple-input, multiple output (MIMO) operation.

16. A method, comprising:
transmitting downlink control information (DCI) in a downlink control channel, the downlink control information configured to indicate an allocation of uplink resources with a clustered uplink resource allocation protocol or a contiguous uplink resource allocation protocol, wherein the clustered uplink resource allocation protocol comprises an allocation of two or more clusters with an allocation resolution of one resource block group, wherein each resource block group's size depends on a system bandwidth; and
wherein the downlink control information is formatted to size-match a DCI format configured for a downlink resource allocation protocol.

17. The method of claim 16, wherein the downlink control information is designed to indicate clustered uplink resource allocation and uplink multiple-input, multiple output (MIMO) operation.

18. The method of claim 16, wherein the clustered uplink resource allocation protocol corresponds to a bitmap based downlink resource allocation protocol.

19. An apparatus, comprising:
means for transmitting downlink control information (DCI) in a downlink control channel, the downlink control information comprising an allocation of uplink resources with a clustered uplink resource allocation protocol or a contiguous uplink resource allocation protocol, wherein the clustered uplink resource allocation protocol comprises an allocation of two or more clusters with an allocation resolution of one resource block group, wherein each resource block group's size depends on a system bandwidth, and
wherein the downlink control information is formatted to size-match a DCI format configured for a downlink resource allocation protocol; and
means for indicating whether the allocation of uplink resources comprises the clustered uplink resource allocation protocol or the contiguous uplink resource allocation protocol.

20. The apparatus of claim 19, wherein the downlink control information is configured to indicate clustered uplink resource allocation and uplink multiple-input, multiple output (MIMO) operation.

21. A communication device, comprising:
a processor; and
a memory comprising processor executable instructions that, when executed by the processor, configures the communication device to:
transmit downlink control information (DCI) in a downlink control channel, the downlink control information configured to indicate an allocation of uplink resources with a clustered uplink resource allocation protocol or a contiguous uplink resource allocation protocol, wherein the clustered uplink resource allocation protocol comprises an allocation of two or more clusters with an allocation resolution of one resource block group, wherein each resource block group's size depends on a system bandwidth, and
wherein the downlink control in information is formatted to size-match a DCI format configured for a downlink resource allocation protocol.

22. The communication device of claim 21, wherein the downlink control information is configured to indicate clustered uplink resource allocation and uplink multiple-input, multiple output (MIMO) operation.

23. A computer program product, embodied on a non-transitory computer-readable storage medium, comprising:
program code for transmitting downlink control information (DCI) in a downlink control channel, the downlink control information configured to indicate an allocation of uplink resources with a clustered uplink resource allocation protocol or a contiguous uplink resource allocation protocol, wherein the clustered uplink resource allocation protocol comprises an allocation of two or more clusters with an allocation resolution of one resource block group, wherein each resource block group's size depends on a system bandwidth, and
wherein the downlink control information is formatted to size-match a DCI format configured for a downlink resource allocation protocol.

24. The computer program product of claim 23, wherein the downlink control information is configured to indicate clustered uplink resource allocation and uplink multiple-input, multiple output (MIMO) operation.

25. The apparatus of claim 10, wherein the two or more clusters is two clusters, and said each resource block group comprises 1, 2, 3 or 4 resource blocks and is based on a system bandwidth.

26. The communication device of claim 12, wherein the two or more clusters is two clusters, and said each resource block group comprises 1, 2, 3 or 4 resource blocks and is based on a system bandwidth.

27. The computer program product of claim 14, wherein the two or more clusters is two clusters, and said each resource block group comprises 1, 2, 3 or 4 resource blocks and is based on a system bandwidth.

28. The method of claim 16, wherein the two or more clusters is two clusters, and said each resource block group comprises 1, 2, 3 or 4 resource blocks and is based on a system bandwidth.

29. The apparatus of claim 19, wherein the two or more clusters is two clusters, and said each resource block group comprises 1, 2, 3 or 4 resource blocks and is based on a system bandwidth.

30. The communication device of claim 21, wherein the two or more clusters is two clusters, and said each resource block group comprises 1, 2, 3 or 4 resource blocks and is based on a system bandwidth.

31. The computer program product of claim 23, wherein the two or more clusters is two clusters, and said each resource block group comprises 1, 2, 3 or 4 resource blocks and is based on a system bandwidth.

32. The method according to claim 1, further comprising receiving second DCI in a downlink control channel, where the downlink control information is configured to indicate an allocation of downlink resources, wherein the allocation of downlink resources has said allocation resolution of one resource block group.

33. The apparatus according to claim 10, further comprising means for receiving second DCI in a downlink control channel, where the downlink control information is configured to indicate an allocation of downlink resources, wherein the allocation of downlink resources has said allocation resolution of one resource block group.

34. The communication device according to claim 12, wherein the memory further comprises executable instructions that, when executed by the processor, configures the communication device to: receive second DCI in a downlink control channel, where the downlink control information is configured to indicate an allocation of downlink resources, wherein the allocation of downlink resources has said allocation resolution of one resource block group.

35. The computer program product according to claim 14, further comprising program code for receiving second DCI in a downlink control channel, where the downlink control information is configured to indicate an allocation of downlink resources, wherein the allocation of downlink resources has said allocation resolution of one resource block group.

36. The method according to claim 16, further comprising receiving second DCI in a downlink control channel, where the downlink control information is configured to indicate an allocation of downlink resources, wherein the allocation of downlink resources has said allocation resolution of one resource block group.

37. The apparatus according to claim 19, further comprising means for receiving second DCI in a downlink control channel, where the downlink control information is configured to indicate an allocation of downlink resources, wherein the allocation of downlink resources has said allocation resolution of one resource block group.

38. The communication device according to claim 21, wherein the memory further comprises executable instructions that, when executed by the processor, configures the communication device to: receive second DCI in a downlink control channel, where the downlink control information is configured to indicate an allocation of downlink resources, wherein the allocation of downlink resources has said allocation resolution of one resource block group.

39. The computer program product according to claim 23, further comprising program code for receiving second DCI in a downlink control channel, where the downlink control information is configured to indicate an allocation of downlink resources, wherein the allocation of downlink resources has said allocation resolution of one resource block group.

* * * * *